US010996665B2

(12) United States Patent
Spiro et al.

(10) Patent No.: US 10,996,665 B2
(45) Date of Patent: May 4, 2021

(54) DETERMINING MAINTENANCE FOR A MACHINE

(71) Applicant: Palantir Technologies Inc., Denver, CO (US)

(72) Inventors: Ezra Spiro, New York, NY (US); Andre Frederico Cavalheiro Menck, New York, NY (US); Anshuman Prasad, New York, NY (US); Arthur Thouzeau, London (GB); Caroline Henry, London (GB); Charles Shepherd, London (GB); Jennifer Yip, Wembley (GB); Joanna Peller, London (GB); Marco Diciolla, London (GB); Matthew Todd, London (GB); Peter Maag, Brooklyn, NY (US); Spencer Tank, Princeton, NJ (US); Thomas Powell, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 16/880,102

(22) Filed: May 21, 2020

(65) Prior Publication Data
US 2020/0285227 A1 Sep. 10, 2020

Related U.S. Application Data

(63) Continuation of application No. 15/839,743, filed on Dec. 12, 2017, now Pat. No. 10,663,961.

(30) Foreign Application Priority Data

Dec. 19, 2016 (GB) ..................................... 1621623
Mar. 22, 2017 (EP) ..................................... 17162421

(51) Int. Cl.
*G05B 23/02* (2006.01)
*G06Q 10/00* (2012.01)

(52) U.S. Cl.
CPC ....... *G05B 23/0283* (2013.01); *G05B 23/024* (2013.01); *G05B 23/0235* (2013.01);
(Continued)

(58) Field of Classification Search
CPC ............ G05B 23/0283; G05B 23/0235; G05B 23/024; G05B 23/0264; G05B 23/0272;
(Continued)

(56) References Cited

U.S. PATENT DOCUMENTS 6,625,589 B1    9/2003  Varma et al.
9,582,781 B1 *  2/2017  Kearns ................... G06N 20/00
(Continued)

FOREIGN PATENT DOCUMENTS

EP    2728429    5/2014
EP    2816431    12/2014
(Continued)

OTHER PUBLICATIONS

Official Communication for European Patent Application No. 17161857.2 dated Dec. 13, 2017.
(Continued)

*Primary Examiner* — Raymond L Nimox
(74) *Attorney, Agent, or Firm* — Sheppard Mullin Richter & Hampton LLP

(57) ABSTRACT

Systems, methods, non-transitory computer readable media can be configured to accessing a target sensor log corresponding to a first machine; accessing one or more prior sensor logs corresponding to the first machine and one or more prior sensor logs corresponding to a plurality of second machines which are of the same type as the first machine; accessing a plurality of computer readable logs correspond-
(Continued)

ing to the first machine and the second machines, the computer readable logs for each second machine comprising a maintenance log comprising a plurality of maintenance task objects, each maintenance task object comprising a time and a maintenance task type; determining a set of statistical metrics characterising a difference between the target sensor log and each prior sensor log; selecting a sub-set of the prior sensor logs in dependence upon the statistical metrics; analysing the maintenance logs to correlate each prior sensor log included in the subset to one or more correlated maintenance tasks; selecting a priority maintenance task based on the sub-set of prior sensor logs, t and the correlated maintenance tasks; and outputting the priority maintenance task.

20 Claims, 16 Drawing Sheets

(52) U.S. Cl.
CPC ..... G05B 23/0264 (2013.01); G05B 23/0272 (2013.01); G06Q 10/20 (2013.01); *G05B 2219/32128* (2013.01); *G05B 2219/32371* (2013.01); *G06Q 10/00* (2013.01)

(58) Field of Classification Search
CPC ........... G05B 2219/32128; G05B 2219/32371; G06Q 10/20; G06Q 10/00
See application file for complete search history.

(56) References Cited

U.S. PATENT DOCUMENTS

| | | | |
|---|---|---|---|
| 9,705,817 B2 | 7/2017 | Lui et al. | |
| 2004/0102924 A1* | 5/2004 | Jarrell | F01K 13/02 |
| | | | 702/181 |
| 2005/0081410 A1 | 4/2005 | Furem et al. | |
| 2011/0231169 A1 | 9/2011 | Furem et al. | |
| 2011/0282630 A1* | 11/2011 | Rikkola | G05B 23/02 |
| | | | 702/184 |
| 2012/0317058 A1 | 12/2012 | Abhulimen | |
| 2013/0080641 A1 | 3/2013 | Lui et al. | |
| 2014/0324495 A1 | 10/2014 | Zhou et al. | |
| 2014/0324862 A1 | 10/2014 | Bingham et al. | |
| 2014/0331277 A1 | 11/2014 | Frascadore et al. | |
| 2014/0379626 A1 | 12/2014 | Hessmer | |
| 2016/0146709 A1 | 5/2016 | Dey et al. | |
| 2016/0247129 A1 | 8/2016 | Song et al. | |
| 2016/0350671 A1* | 12/2016 | Morris, II | G05B 23/0229 |
| 2016/0373293 A1* | 12/2016 | Kushmerick | H04L 67/10 |
| 2017/0083390 A1 | 3/2017 | Talwadker et al. | |

FOREIGN PATENT DOCUMENTS

| | | |
|---|---|---|
| WO | WO 2011/036809 | 3/2011 |
| WO | WO 2014/117245 | 8/2014 |

OTHER PUBLICATIONS

Official Communication for European Patent Application No. 17162421.6 dated Sep. 6, 2017.

\* cited by examiner

245        Update maintenance log for Ship 1

Input maintenance task(s) performed:

Task 1    B-T-043 ▼      246

Notes: [...]

Task 2    Please select ▼      247

Notes:

( Add more tasks ) — 248

Outcome      249

Fault B-F-006 is: ● Resolved    ○ Not resolved ( OK ) — 250      251 — ( Cancel )

Fig.19

DETERMINING MAINTENANCE FOR A MACHINE

CROSS-REFERENCE TO RELATED APPLICATIONS

This application is a continuation of U.S. application Ser. No. 15/839,743, filed Dec. 12, 2017, which claims priority to European Application No. 17162421.6, filed Mar. 22, 2017 and United Kingdom Application No. 1621623.6, filed Dec. 19, 2016, the contents of each of which are incorporated herein by reference in their entirety.

FIELD OF THE DISCLOSURE

The present disclosure relates to determining a maintenance task for a machine.

BACKGROUND

Machines are increasingly being fitted with sensors to record and control the functions of the machine and sub-systems of the machine. For example, a diesel engine for construction machinery such as, for example, a bulldozer, digger and so forth may include sensors which measure, amongst other variables, injected fuel pressure, mass-flow of air into the engine, engine temperature, oxygen concentration in the outlet gases and so forth, to allow precise adjustments of the fuel/air mix. Similarly, a ship typically includes hundreds, thousands or tens of thousands of sensors measuring parameters such as speed, fuel temperature, stresses in the propeller shafts and so forth. Many ships are powered by marine diesel engines, liquefied natural gas (LNG) engines or combi-fuel engines which may be powered using diesel or LNG. Some ships may include gas-turbine engines. Regardless of the particular type of engine, ship engines similarly include large numbers of sensors for operational, monitoring and diagnostic purposes.

Often, sensors fitted to machines are linked to local electronic processors which control a local process and/or provide a warning or fault message when a physical parameter measured by a sensor moves outside of a predefined range. Such controls and monitoring are based on a local view or on assumptions about the behaviour of a subsystem and interrelated sub-systems of a machine.

SUMMARY

According to some embodiments of the specification there is provided a method of determining a maintenance task for a machine. The method is performed using one or more processors or special-purpose computing hardware. The method includes accessing a target sensor log corresponding to a first machine. The method also includes accessing one or more prior sensor logs corresponding to the first machine and one or more prior sensor logs corresponding to a plurality of second machines which are of the same type as the first machine. The method also includes accessing a plurality of computer readable logs corresponding to the first machine and the second machines. The computer readable logs for each second machine include a maintenance log. Each maintenance log includes a plurality of maintenance task objects, each maintenance task object including a time and a maintenance task type. The method also includes determining a set of statistical metrics characterising a difference between the target sensor log and each prior sensor log. The method also includes selecting a sub-set of the prior sensor logs in dependence upon the statistical metrics. The method also includes analysing the maintenance logs to correlate each prior sensor log included in the subset to one of or more correlated maintenance tasks. The method also includes selecting a priority maintenance task based on the sub-set of prior sensor logs, the ranking of prior sensor logs and the correlated maintenance tasks. The method also includes outputting the priority maintenance task.

The computer readable logs may also include, for the first machine and for each second machine, a message log including a plurality of message objects, each message object including a time and a message type.

The computer readable logs may also include, for the first machine and for each second machine, a fault log including a plurality of fault objects, each fault object including a time, a duration and a fault type.

Selecting a sub-set of the prior sensor logs may include ranking each prior sensor log, based on the statistical metrics, according to the one or more comparisons between the prior sensor log and the target sensor log, and selecting the sub-set as a number, N, of the prior sensor logs which are ranked as the N closest to the target sensor log.

Selecting a sub-set of the prior sensor logs may include selecting each prior sensor log having statistical metrics which satisfy one or more thresholds.

The method may also include accessing a target maintenance log corresponding to the first machine and which includes a plurality of maintenance task objects, each maintenance task object comprising a time and a maintenance task type. The method may also include accessing a target fault log which includes a target fault object corresponding to the first machine, the target fault object including a time, a duration and a fault type. The method may also include accessing a target message log corresponding to the first machine and which includes a plurality of message objects, each message object including a time and a message type. The method may also include determining a set of log metrics derived from the computer readable logs, the target maintenance log, the target fault log and the target message log. Selecting a sub-set of the prior sensor logs may be based on the statistical metrics and the log metrics.

The method may also include carrying out the priority maintenance task on the first machine.

The method may also include presenting the priority maintenance task on a display. The method may also include generating a textual report identifying the priority maintenance task.

The method may also include receiving an indication of whether the priority maintenance task is effective and, in dependence upon the priority maintenance task is ineffective, updating the maintenance log corresponding to the first machine, and selecting a new priority maintenance task by re-determining, based on the updated maintenance log corresponding to the first machine, the sub-set of prior sensor logs, the ranking of prior sensor logs and the correlated maintenance tasks. The method may also include outputting the new priority maintenance task.

Correlating each prior sensor log included in the subset to one or more correlated maintenance tasks may also include determining a number and type of one or more spare parts and/or one or more consumables associated with each correlated maintenance task.

According to some embodiments of the present specification there is provided a computer program, optionally stored on a non-transitory computer readable medium program which, when executed by one or more processors of a data processing apparatus, causes the data processing apparatus to carry out the method.

According to some embodiments of the present specification there is provided apparatus for determining a maintenance task for a machine, the apparatus including one or more processors or dedicated hardware configured to access a target sensor log corresponding to a first machine. The apparatus may also be configured to access one or more prior sensor logs corresponding to the first machine and one or more prior sensor logs corresponding to a plurality of second machines which are of the same type as the first machine. The apparatus may also be configured to access a plurality of computer readable logs corresponding to the first machine and the second machines. The computer readable logs for each second machine including a maintenance log which includes a plurality of maintenance task objects. Each maintenance task object includes a time and a maintenance task type. The apparatus also includes a statistical metric determining module configured to determine a set of statistical metrics characterising a difference between the target sensor log and each prior sensor log. The apparatus also includes a ranking module configured to select a sub-set of the prior sensor logs in dependence upon the statistical metrics. The apparatus also includes a fault maintenance correlation module configured to analyse the maintenance logs to correlate each prior sensor log included in the subset to one or more correlated maintenance tasks. The apparatus also includes a maintenance task determining module configured to select a priority maintenance task based on the sub-set of prior sensor logs, and the correlated maintenance tasks, and output the priority maintenance task.

The computer readable logs may also include, for the first machine and for each second machine, a message log which includes a plurality of message objects, each message object including a time and a message type.

The computer readable logs may also include, for the first machine and for each second machine, a fault log which includes a plurality of fault objects, each fault object including a time, a duration and a fault type.

The ranking module may be configured to rank each prior sensor log, based on the statistical metrics, according to one or more comparisons between the prior sensor log and the target sensor log. The ranking module may be configured to select the sub-set as a number, N, of the prior sensor logs which are ranked as the N closest to the target sensor log.

The ranking module may be configured to select a sub-set of the prior sensor logs by selecting each prior sensor log having statistical metrics which satisfy one or more thresholds.

The apparatus may also be configured to access a target maintenance log corresponding to the first machine and which includes a plurality of maintenance task objects. Each maintenance task object may include a time and a maintenance task type. The apparatus may also be configured to access a target fault log which includes a target fault object corresponding to the first machine. The target fault object may include a time, a duration and a fault type. The apparatus may also be configured to access a target message log corresponding to the first machine and including a plurality of message objects. Each message object may include a time and a message type. The apparatus may also include a log metric determining module configured to determine a set of log metrics derived from the computer readable logs, the target maintenance log, the target fault log and the target message log. The ranking module may also be configured to select a sub-set of the prior sensor logs based on the statistical metrics and the log metrics.

The apparatus may include a robotic maintenance system configured to carry out the priority maintenance task on the first machine. The apparatus may include a display configured to display the priority maintenance task. The apparatus may include a report generation system configured to generate a textual report identifying the priority maintenance task.

The fault maintenance correlation module may also be configured to determine a number and type of one or more spare parts and/or one or more consumables associated with each correlated maintenance task.

According to some embodiments of the present specification there is provided a method of determining a maintenance task for a machine, wherein the method is performed using one or more processors or special-purpose computing hardware. The method includes accessing a target maintenance log corresponding to a first machine and which includes a plurality of maintenance task objects. Each maintenance task object includes a time and a maintenance task type. The method also includes accessing a target fault log which includes a target fault object corresponding to the first machine. The target fault object includes a time, a duration and a fault type. The method also includes accessing a plurality of computer readable logs corresponding to a plurality of second machines which are of the same type as the first machine. The computer readable logs for each second machine include a maintenance log which includes a plurality of maintenance task objects. Each maintenance task object includes a time and a maintenance task type. The computer readable logs for each second machine also include a fault log which includes a plurality of fault objects. Each fault object includes a time, a duration and a fault type. The method also includes determining a set of log metrics derived from the target maintenance log, the target fault log and the computer readable logs. The method also includes selecting a sub-set of the prior sensor logs in dependence upon the log metrics. The method also includes analysing the maintenance logs to correlate each prior sensor log included in the subset to one of or more correlated maintenance tasks. The method also includes selecting a priority maintenance task based on the sub-set of prior sensor logs, the ranking of prior sensor logs and the correlated maintenance tasks. The method also includes outputting the priority maintenance task.

The method may also include accessing a target message log corresponding to the first machine and which includes a plurality of message objects. Each message object may include a time and a message type. The computer readable logs may include, for each second machine, a message log which includes a plurality of message objects. Each message object may include a time and a message type. Determining a set of log metrics may include determining a set of log metrics derived from the target maintenance log, the target fault log, the target message log and the computer readable logs.

BRIEF DESCRIPTION OF THE DRAWINGS

FIG. 19 shows a dialog interface forming part of the graphical user interface shown in FIG. 18.

DETAILED DESCRIPTION

Figure 1:
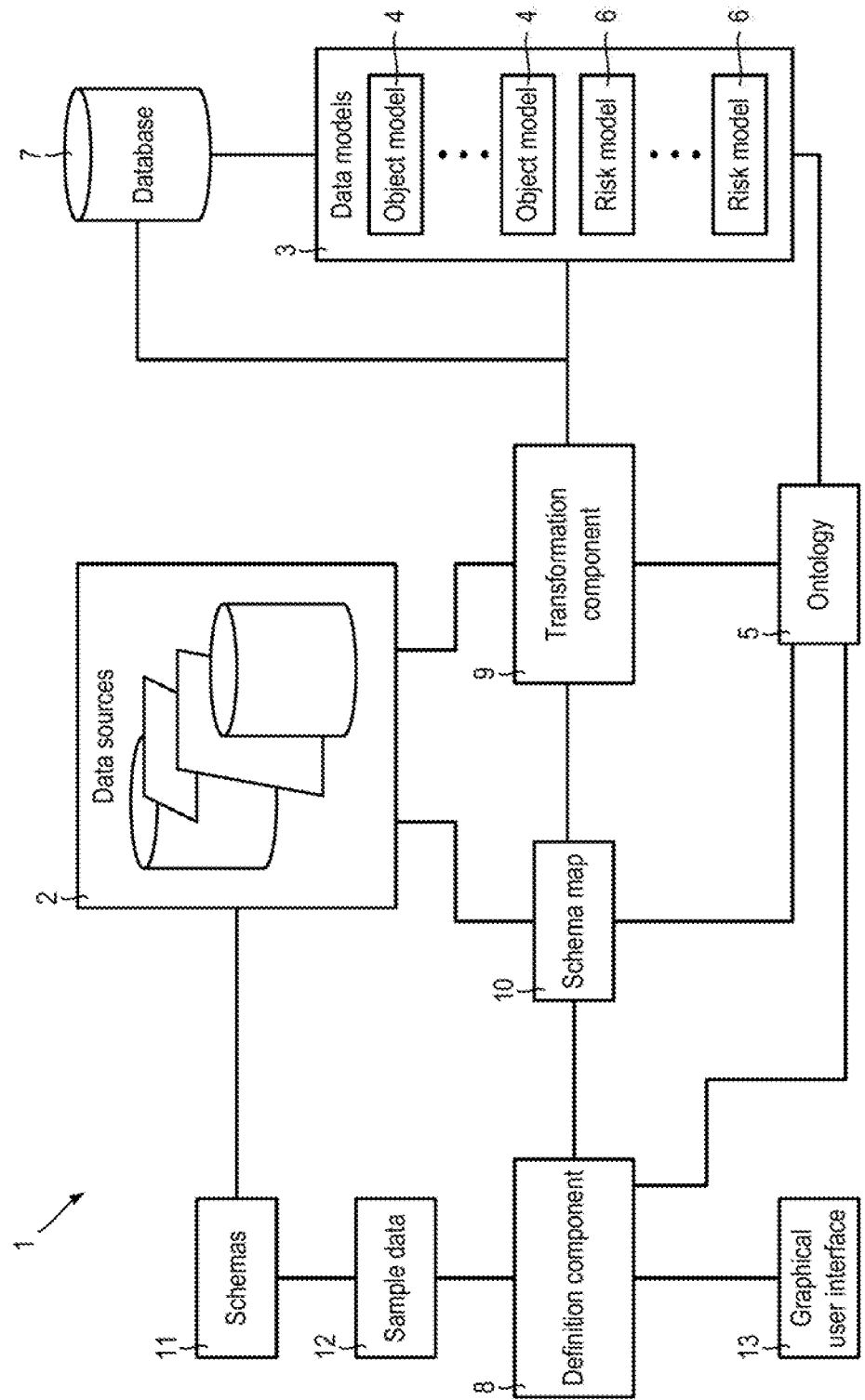
FIG. 1 is a block diagram illustrating a data fusion system according to embodiments of this specification for providing interactive data analysis.

In brief, this specification describes determining a maintenance task which can rectify an anomaly or fault which has occurred in a machine through processing of history data for the machine History data for a machine includes sensor logs, a sensor log being multiple measurements of physical parameters captured by a sensor and relating to different points in time (a time series). History data for a machine also includes computer readable logs such as maintenance logs, fault logs and message logs corresponding to a machine. The maintenance log corresponding to the machine records information such as dates and locations of prior maintenance tasks, details of replacement parts, free text notes made by an engineer or mechanic performing a maintenance task and so forth. The fault log corresponding to the machine records information such as dates and locations of faults, the types of faults, the period of time required to rectify each fault and so forth. The message log corresponding to a machine, such as a ship or a construction machine, records messages generated by controllers, processors or similar devices which are integrated into the component sub-systems of the machine. The messages may include a date and time, an identifier of a component sub-system, and message content such as, for example, warning information of information identifying a fault.

In some embodiments, when a first machine has developed an anomaly or a fault, recent history data for the first machine is compared with previous history data for the first machine and history data corresponding to a number of second machines which are the same or comparable to the first machine. The comparison utilises statistical metrics generated based on sensor logs and log metrics generated based on computer readable logs. Essentially, the comparison identifies previous recorded anomalies or faults which are similar to the anomaly or fault which has developed in the first machine. Based on maintenance tasks which were performed and/or rectified the similar previous anomalies or faults identified, a priority maintenance task for the first machine is determined.

Conventionally, when a machine has developed an anomaly or a fault, it may be difficult to determine and rectify the root cause. One or more maintenance tasks can be carried out which fail to rectify the anomaly or fault. This can result in wasted time and other resources such as consumables and/or spare parts. This specification describes how efficiency of rectifying an anomaly or a fault of a machine can be improved by identifying similar anomalies or faults which have previously occurred, and determining how the similar anomalies of faults were rectified.

In this way, decision making about how to proceed when a machine develops an anomaly or a fault may be placed on a quantitative footing. By selecting a maintenance task which has previously been effective in similar circumstances, ineffective maintenance tasks can be avoided and effective maintenance tasks can be carried out sooner. This can reduce the time that a machine is out of service. This can reduce wastage of consumables and spare parts associated with ineffective maintenance tasks, as well as reducing engineer utilisation.

Reference will now be made to certain examples which are illustrated in the accompanying drawings. Whenever possible, the same reference numbers will be used throughout the drawings to refer to the same or like parts.

FIG. 1 illustrates, in block diagram form, an exemplary data fusion system 1 for providing interactive data analysis, consistent with embodiments of the present disclosure. Among other things, data fusion system 1 facilitates analysis and transformation of one or more data sources 2 such as, for example, sensors 19 (FIG. 2), maintenance logs 16 (FIG. 2), fault logs 17 (FIG. 2), message logs 21 (FIG. 2) and so forth, into data models 3. Data models 3 may include one or more object models 4 whose semantics are defined by an ontology 5. Data models 3 may also include one or more risk models 6 for calculating a failure probability or risk score for a machine 15, or a sub-system 18 of the machine, during a particular interval. Risk models 6 are machine learning models or weighted average models generated in dependence upon data accessed from the data sources 2. The transformation can be performed for a variety of reasons. For example, an engineer or mechanic may import data from data sources 2 into a database 7 for persistently storing object model(s) 4. As another example, an engineer or mechanic may import data from data sources 2 in order to define, refine or apply a risk model 6. As another example, a data presentation component can transform input data from data sources 2 "on the fly" (in substantially real time, as the data is generated) into object model(s) 4. The object model(s) 4 can then be utilized, in conjunction with ontology 5, for analysis through graphs and/or other data visualization techniques. Data from data sources 2 may take the form of numerical data, text information in defined or free-text formats, or a combination of numerical, textual and/or other data types. Data from data sources 2 may be analysed to extract metrics in the process of transforming the data into object models 4 and/or risk models 6.

Data fusion system 1 includes a definition component 8 and a translation component 9, both implemented by one or more processors of one or more computing devices or systems executing hardware and/or software-based logic for providing various functionality and features of the present disclosure, as described herein. The data fusion system 1 can comprise fewer or additional components that provide the various functionalities and features described herein. Moreover, the number and arrangement of the components of data fusion system 1 which are responsible for providing the various functionalities and features described herein can further vary between different examples of the data fusion system 1.

The definition component 8 generates and/or modifies the ontology 5 and a schema map 10. Examples of defining an ontology (such as ontology 5) are described in U.S. Pat. No. 7,962,495 (the '495 patent), issued on Jun. 14, 2011, the entire contents of which are expressly incorporated herein by reference for all purposes. Consistent with certain examples disclosed in the '495 patent, a dynamic ontology may be used to create a database, for example database 7. To create a database ontology, one or more object types may be defined, where each object type includes one or more properties. The attributes of object types or property types of the ontology can be edited or modified at any time. At least one parser definition may be created for each property type. The attributes of a parser definition can be edited or modified at any time.

In some examples, each property type is declared to be representative of one or more object types. A property type is representative of an object type when the property type is intuitively associated with the object type. In some embodiments, each property type has one or more components and a base type. In some embodiments, a property type can comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is an "engine temperatures" property having an "exhaust temperature" component and an "inlet temperature" component. For example, the "inlet temperature" may correspond to the temperature of ambient air drawn into a diesel engine and the "exhaust temperature" may correspond to the temperature of exhaust gasses expelled from the diesel engine. An example of raw input data is "300 K". An example parser definition specifies an association of imported input data to object property components as follows: {EXHAUST TEMPERATUR2E}, {INLET TEMPERATURE}→EngineTemperatures:ExhaustTemperature, EngineTemperatures:InletTemperature. In some embodiments, the association {EXHAUST TEMPERATURE}, {INLET TEMPERATURE} is defined in a parser definition using regular expression symbology. The association {EXHAUST TEMPERATURE}, {INLET TEMPERATURE} indicates that an exhaust temperature followed by an inlet temperature, and separated by a comma, comprises valid input data for a property of type "engine temperature".

According to some embodiments, schema map 10 can define how various elements of schemas 11 for data sources 2 map to various elements of ontology 5. Definition component 8 receives, calculates, extracts, or otherwise identifies schemas 11 for data sources 2. Schemas 11 define the structure of data sources 2; for example, the names and other characteristics of tables, files, columns, fields, properties, and so forth. Furthermore, definition component 8 optionally identifies sample data 12 from data sources 2. Definition component 8 can further identify object type, relationship, and property definitions from ontology 5, if any already exist. Definition component 8 can further identify pre-existing mappings from schema map 10, if such mappings exist. Some data sources 2 may be substantially unstructured, for example, in the form of free-text which is analysed for keywords and/or using natural language processing. For substantially unstructured data sources, the schema map 10 may define how various elements of schemas 11 map to ontology 5 for processing free-text, for example parameters or semantic rules.

Based on the identified information, definition component 8 can generate a graphical user interface 13. Graphical user interface 13 can be presented to users of a computing device via any suitable output mechanism (e.g., a display screen, an image projection, etc.), and can further accept input from users of the computing device via any suitable input mechanism (e.g., a keyboard, a mouse, a touch screen interface, etc.). Graphical user interface 13 features a visual workspace that visually depicts representations of the elements of ontology 5 for which mappings are defined in schema map 10.

In some embodiments, transformation component 9 can be invoked after schema map 10 and ontology 5 have been defined or redefined. Transformation component 9 identifies schema map 10 and ontology 5. Transformation component 9 further reads data sources 2 and identifies schemas 11 for data sources 2. For each element of ontology 5 described in schema map 10, transformation component 9 iterates through some or all of the data items of data sources 2, generating elements of object model(s) 4 in the manner specified by schema map 10. In some examples, the transformation component 9 may process data from data sources 2 to generate statistical or other metrics based on the data. The statistical or other metrics may be stored in the database 7. In some examples, the transformation component 9 may generate one or more risk models 6 based on the data from data sources 2. Risk models 6 generated by the transformation component 9 may be stored in the database 7. In some examples, the transformation component 9 may apply risk models 6 to data from data sources 2 in order to calculate a failure probability or risk score for a machine within a specified interval. In some examples, transformation component 9 can store a representation of each generated element of an object model 4 in the database 7. In some examples, transformation component 9 is further configured to synchronize changes in the object model(s) 4 back to data sources 2.

Data sources 2 can be one or more sources of data, including, without limitation, spreadsheet files, databases, email folders, document collections, sensor memory storages, and so forth. Documents may include native electronic documents and scanned documents. Scanned documents may be processed using optical character recognition. Data sources 2 can include data structures stored persistently in non-volatile memory. Data sources 2 can additionally or alternatively include temporary data structures generated from underlying data sources via data extraction components, such as a result set returned from a database server executing a database query.

Schema map 10, ontology 5, and schemas 11 can be stored in any suitable structures, such as XML files, database tables, and so forth. In some embodiments, ontology 5 is maintained persistently. Schema map 10 can or cannot be maintained persistently, depending on whether the transformation process is perpetual, or a one-time event. Schemas 11 need not be maintained in persistent memory, but can be cached for optimization.

The object model(s) 4 comprise collections of elements such as typed objects, numerical data, properties, and relationships. The collections can be structured in any suitable manner. In some examples, a database 7 stores the elements of the object model(s) 4, or representations thereof. In some examples, the elements of an object model 4 are stored within database 7 in a different underlying format, such as in a series of object, property, and relationship tables in a relational database. The risk models 6 comprise collections of elements such as, for example, weighting tables, decision trees, kernels, Bayesian graphs/networks, artificial neural networks or similar elements of a machine learning model.

According to some embodiments, the functionalities, techniques, and components described herein are implemented by one or more special-purpose computing devices. The special-purpose computing devices can be hard-wired to perform the techniques, or can include digital electronic devices such as one or more application-specific integrated circuits (ASICs) or field programmable gate arrays (FPGAs) that are persistently programmed to perform the techniques, or can include one or more general purpose hardware processors (each including processor circuitry) programmed to perform the techniques pursuant to program instructions in firmware, memory, other storage, or a combination. Such special-purpose computing devices can also combine custom hard-wired logic, ASICs, or FPGAs with custom programming to accomplish the techniques. The special-purpose computing devices can be desktop computer systems, portable computer systems, handheld devices, networking devices, or any other device that incorporates hard-wired and/or program logic to implement the techniques.

In examples described herein, data fusion system 1 can allow a user, such as an engineer or mechanic, to analyse information and identify underlying trends, patterns, behaviours and/or precursors which allow the engineer or mechanic to make more informed decisions. Such information can allow an engineer or mechanic to determine the most effective maintenance to perform on a machine. Additionally, when a fault or anomaly has developed in a complex machine, an engineer or mechanic may use the data fusion system 1 to obtain information about a root cause of an anomaly or fault. Other applications of the data fusion system 1 shall be described hereinafter.

For purposes of illustration, examples are described herein with reference to ships, for example passenger cruise ships, cargo ships, tankers and so forth. However, the examples and techniques described herein may be applied to other types of machines such as, for example, construction machinery in the form of bulldozers, tractors, diggers, any other types of mobile equipment. The examples and techniques described herein may also be applied to further types of machines such as, for example, manufacturing plant, sewage treatment plant, tunneling/boring equipment and so forth, within the spirit and scope of this disclosure.

Figure 2:
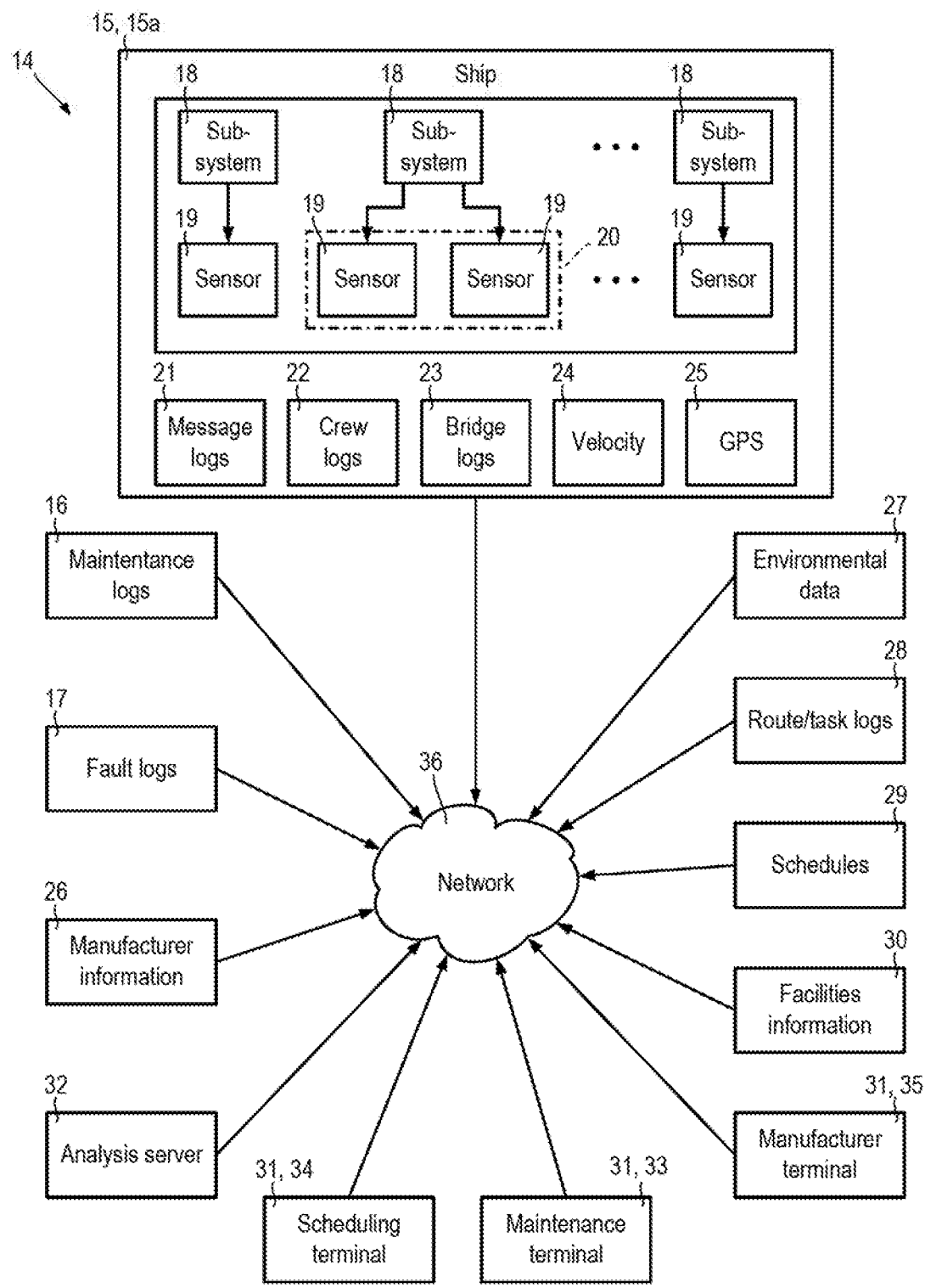
FIG. 2 is a block diagram of a first exemplary system according to embodiments of this specification for analysing and/or modelling a machine.

FIG. 2 shows a block diagram of a first exemplary system 14 for performing one or more operations for analysing and/or modelling a machine 15. In the first system 14, the machine 15 is a ship 15a and the first system 14 can include one or more ships 15a. The ships 15a may be, for example, passenger cruise ships, car transporter ferries, cargo ships, tanker ships, tugs and so forth. Each ship 15a has a corresponding maintenance log 16 and fault log 17. The maintenance log 16 for a ship 15a may include information such as dates and locations of maintenance, details of replacement parts used, free text notes made by an engineer or mechanic performing a maintenance task and so forth. The fault log 17 for a ship 15a may include information such as dates and locations of faults, the type of fault, the period of time required to rectify the fault and so forth. The maintenance logs 16 and fault logs 17 are stored in suitable computer readable formats or structures, such as XML files, database tables, and so forth. The maintenance log 16 and fault log 17 corresponding to a ship 15a may be stored on one or more servers and/or locally on the ship 15a. Maintenance logs 16 and fault logs 17 corresponding to a number of different ships 15a may be stored in a common database, for example database 7.

Each ship 15a includes a number of sub-systems 18 which may be mechanical systems, electrical systems, computer systems or combinations thereof. For example, sub-systems 18 for a ship 15a may include, but are not limited to, a navigational computer system, a crew area and/or cargo area environmental control and monitoring systems, a fuel management system, engine management systems, a hydraulic system, a fire suppression system, a bilge system and so forth. Each sub-system 18 may include one or more sensors 19 which monitor physical parameters of the sub-system. One or more sensors 19 associated with a sub-system form a sensor group 20. Examples of sensors 19 include a temperature sensor, a pressure sensor, a water level sensor, an electrical current or voltage sensor, a gas concentration sensor, a strain gauge, and so forth. Data from sensors 19 may be stored on the ship 15a and subsequently transmitted or downloaded from the ship 15a according to a schedule, for example upon arrival at a destination port, daily or weekly. Data from some sensors 19 may be transmitted to a central operations centre whilst the ship 15a is at sea.

The ship 15a may also store message logs 21, crew logs 22, bridge logs 23, velocity logs 24 and global positioning system (GPS) (or other positioning system) logs 25. The message log 21 corresponding to a ship 15a may include messages generated by controllers (e.g. an automated bilge pump controller), processors or similar devices which are integrated into the various sub-systems 18. The messages may include a date and time, an identifier of an originating sub-system 18, and message contents such as, for example, a warning or fault identifier. Crew logs 22 corresponding to a ship 15a may include forms, notes, checklists or other documents which are produced or confirmed by crew responsible for operating the ship 15a such as, for example, the captain, navigator, engineering crew and/or port crew. Crew logs 22 may include information derived from documents which are native electronic documents and/or scanned documents. Bridge logs 23 may include, for example, bridge audio recordings, logs detailing button presses, keystrokes and control inputs during a voyage and so forth. Velocity logs 24 may include a time series of velocities of the ship 15a. GPS logs 25 may include a time series of GPS coordinates for the ship 15a. Velocity logs and GPS logs are particular examples of sub-systems 18 and sensors 19. Message logs 21, crew logs 22, bridge logs 23, velocity logs 24 and global positioning system (GPS) logs 25 are stored in suitable computer readable formats or structures, such as XML files, database tables and so forth.

The first system 14 may also include manufacturer information 26 including, for example, databases providing information about messages and/or faults, suggested maintenance tasks, and manufacturer recommended tolerances for parameters measured by sensors 19. The first system 14 may also include environmental data 27 such as, for example, information about wind speeds, surface waves, cloud cover, storm systems, currents, tide times as a function of date, time and location. The first system 14 may also include a route/task log 28 corresponding to each ship 15a. The route/task log for a ship 15a may include details of the start and end locations, dates and times of each voyage conducted by the corresponding ship 15a. The first system 14 may also include schedules 29 for the voyages which a fleet including a number of ships 15a need to be assigned to travel over a forthcoming time period. The first system 14 may also include facilities information 30 such as, for example, a type or class of available maintenance and repair facilities at a number of ports between which ships 15a may be scheduled to travel, for example, whether a port has maintenance and inspection divers, dry-dock facilities and so forth.

The manufacturer information 26, environmental data 27, route/task logs 28, schedules 29 and facilities information 30 may be stored in suitable computer readable formats or structures, such as XML files, database tables, and so forth. The manufacturer information 26, environmental data 27, route/task logs 28, schedules 29 and facilities information 30 may be stored in one or more servers.

The maintenance logs 16, fault logs 17, sensors 19, message logs 21, crew logs 22, bridge logs 23, altitude and velocity logs 25, GPS logs 25, manufacturer information 26, environmental data 27, route/task logs 28, schedules 29 and facilities information 30 are examples of data sources 2 for the data fusion system 1.

The first system 14 includes one or more analysis terminals 31 in the form of one or more computing devices (e.g., computer or computers, server or servers, etc.), memory storing data and/or software instructions (e.g., database or databases), memory devices, etc.), and other known computing components. In some examples, the one or more computing devices are configured to execute software or a set of programmable instructions stored on one or more memory devices to perform one or more operations, consistent with the examples herein. The data fusion system 1 may be provided by one or more analysis servers 32 and one or more analysis terminals 31 may connect to the analysis server 32 as clients. Alternatively, each analysis terminal 31 may provide an example of the data fusion system 1. Examples of analysis terminals 31 may provide the same or different functions. For example, different analysis terminals 31 may be able to access different types of data or functions of the analysis server 32. For example, a maintenance terminal 33 may be able to access preventative maintenance and troubleshooting functions. As another example, a scheduling terminal 34 may access data relating to risk model 6 outputs, schedules 29 and facilities information 30 to perform risk based scheduling of ship 15a routes. As another example, a manufacturer terminal 35 may be given access to a reduced or redacted selection of data from the data sources 2, in order to allow monitoring and analysis of technical data whilst preserving the integrity of commercially sensitive information. In some examples, all analysis terminals 31 may access the same data and functions.

The analysis terminals 31 and analysis server 32 communicate with the data sources 2 over a network 36. The network 36 can be any type of network or combination of networks configured to provide electronic communications between components of the first system 14. For example, the network 36 can be any type of network (including infrastructure) that provides communications, exchanges information, and/or facilitates the exchange of information, such as the Internet, a Local Area Network, or other suitable connection(s) that enables the sending and receiving of information between the components of the first system 14.

The network 36 may also comprise any combination of wired and wireless networks. In other embodiments, one or more components of the first system 14 can communicate directly through a dedicated communication link or communication links, such as links between analysis terminals 31, analysis server 32, maintenance logs 16, fault logs 17, sensors 19, message logs 21, crew logs 22, bridge logs 23, velocity logs 25, GPS logs 25, manufacturer information 26, environmental data 27, route/task logs 28, schedules 29 and facilities information 30.

The first system 14 may include a number of machines 15 in the form of ships 15a, and all of the ships 15a forming part of the first system 14 are the same or comparable to one another. Two machines 15 are the same if they include the same components, arranged and configured in the same way. Two machines 15 may be the same if they are manufactured in the same batch or two machines 15 may be the same if they are manufactured in different batches. Two machines 15 which are the same include corresponding sub-systems 18 which are associated with corresponding sensors 19. Two machines 15 are comparable if they contain one or more corresponding sub-systems 18 in common. For two comparable machines 15, the corresponding common sub-systems 18 are not substantially interrelated to other sub-systems 18 which are not common to the machines 15. For example, two ships 15a may be comparable because they are fitted with the same marine diesel engine. Even when data from other systems is not comparable (or not directly comparable), information from engine sensors may be usefully compared between the two comparable ships 15a.

Figure 3:
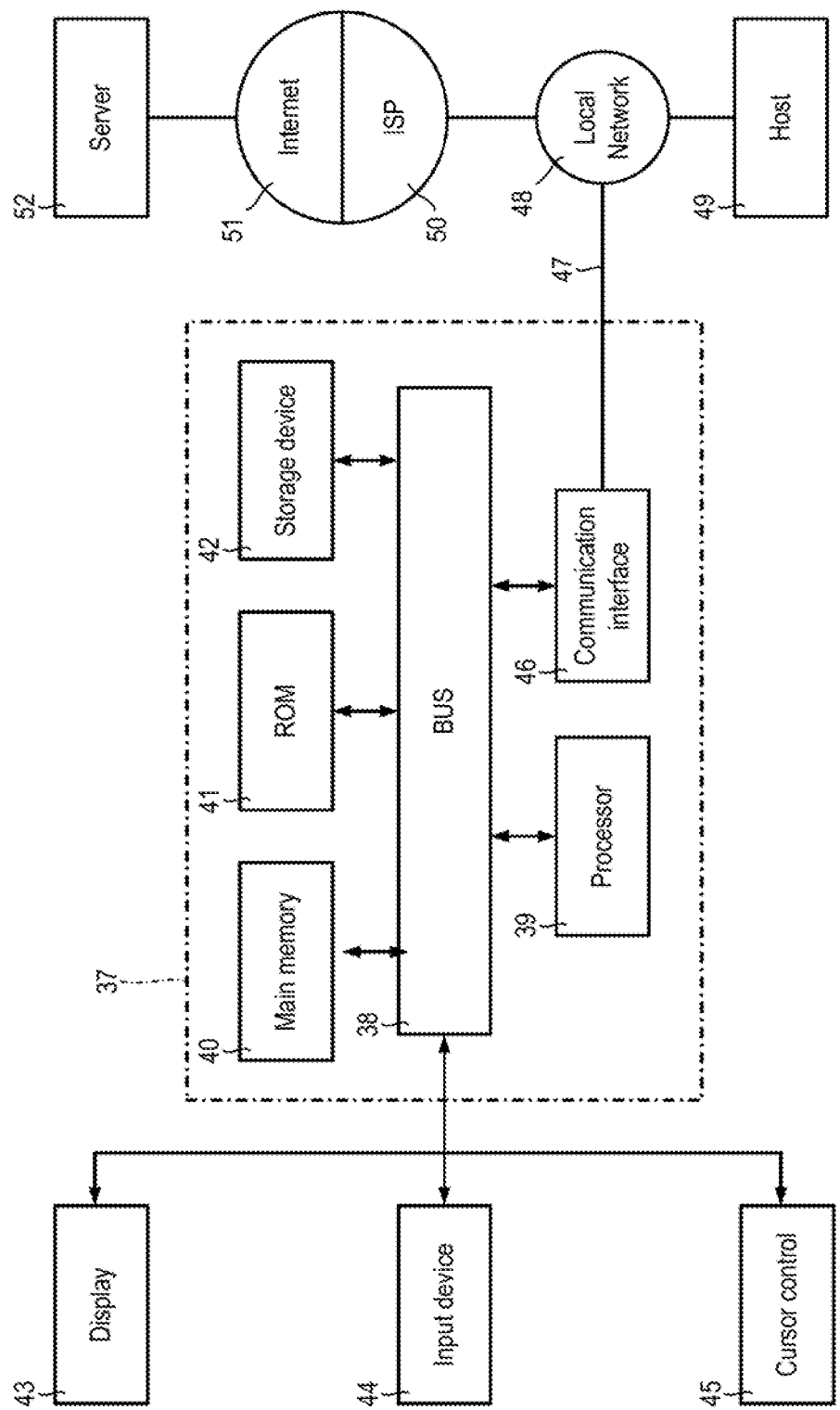
FIG. 3 is a block diagram of a computer system according to embodiments of this specification.

Referring also to FIG. 3, a block diagram of an exemplary computer system 37, consistent with examples of the present specification is shown. The components of the first and second exemplary systems 14, 67 (FIG. 11) such as analysis terminals 31 and analysis server 32 may include an architecture based on or similar to that of computer system 37.

Computer system 37 includes a bus 38 or other communication mechanism for communicating information, and a hardware processor 39 coupled with bus 38 for processing information. Hardware processor 39 can be, for example, a general purpose microprocessor. Hardware processor 39 comprises electrical circuitry.

Computer system 37 includes a main memory 40, such as a random access memory (RAM) or other dynamic storage device, which is coupled to the bus 38 for storing information and instructions to be executed by processor 39. The main memory 40 can also be used for storing temporary variables or other intermediate information during execution of instructions by the processor 39. Such instructions, when stored in non-transitory storage media accessible to the processor 39, render the computer system 37 into a special-purpose machine that is customized to perform the operations specified in the instructions.

Computer system 37 further includes a read only memory (ROM) 41 or other static storage device coupled to the bus 38 for storing static information and instructions for the processor 39. A storage device 42, such as a magnetic disk or optical disk, is provided and coupled to the bus 38 for storing information and instructions.

Computer system 37 can be coupled via the bus 38 to a display 43, such as a cathode ray tube (CRT), liquid crystal display, or touch screen, for displaying information to a user. An input device 44, including alphanumeric and other keys, is coupled to the bus 38 for communicating information and command selections to the processor 39. Another type of user input device is cursor control 45, for example using a mouse, a trackball, or cursor direction keys for communicating direction information and command selections to the processor 39 and for controlling cursor movement on the display 43. The input device typically has two degrees of freedom in two axes, a first axis (for example, x) and a second axis (for example, y), that allows the device to specify positions in a plane.

Computer system 37 can implement the techniques described herein using customized hard-wired logic, one or more ASICs or FPGAs, firmware and/or program logic which in combination with the computer system causes or programs computer system 37 to be a special-purpose machine. According to some embodiments, the operations, functionalities, and techniques disclosed herein are performed by computer system 37 in response to the processor 39 executing one or more sequences of one or more instructions contained in the main memory 40. Such instructions can be read into the main memory 40 from another storage medium, such as storage device 42. Execution of the sequences of instructions contained in main memory 40 causes the processor 39 to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device 42. Volatile media includes dynamic memory, such as main memory 40. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus 38. Transmission media can also take the form of acoustic or light waves, such as those generated during radio-wave and infra-red data communications.

Various forms of media can be involved in carrying one or more sequences of one or more instructions to processor 39 for execution. For example, the instructions can initially be carried on a magnetic disk or solid state drive of a remote computer. The remote computer can load the instructions into its dynamic memory and send the instructions over a telephone line or other transmission medium using a modem. A modem local to computer system 37 can receive the data on the telephone line or other transmission medium and use an infra-red transmitter to convert the data to an infra-red signal. An infra-red detector can receive the data carried in the infra-red signal and appropriate circuitry can place the data on bus 38. Bus 38 carries the data to the main memory 40, from which the processor 39 retrieves and executes the instructions. The instructions received by the main memory 40 can optionally be stored on the storage device 42 either before or after execution by the processor 39.

Computer system 37 also includes a communication interface 46 coupled to the bus 38. The communication interface 46 provides a two-way data communication coupling to a network link 47 that is connected to a local network 48. For example, the communication interface 46 can be an integrated services digital network (ISDN) card, cable modem, satellite modem, or a modem to provide a data communication connection to a corresponding type of telephone line. As another example, the communication interface 46 can be a local area network (LAN) card to provide a data communication connection to a compatible LAN. Wireless links can also be implemented. In any such implementation, the communication interface 46 sends and receives electrical, electromagnetic or optical signals that carry digital data streams representing various types of information.

The network link 47 typically provides data communication through one or more networks to other data devices. For example, the network link 47 can provide a connection through the local network 48 to a host computer 49 or to data equipment operated by an Internet Service Provider (ISP) 50. The ISP 50 in turn provides data communication services through the world wide packet data communication network now commonly referred to as the "Internet" 51. The local network 48 and internet 51 both use electrical, electromagnetic or optical signals that carry digital data streams. The signals through the various networks and the signals on the network link 47 and through the communication interface 46, which carry the digital data to and from the computer system 37, are example forms of transmission media.

The computer system 37 can send messages and receive data, including program code, through the network(s), network link 47 and communication interface 46. In the internet example, a server 52, for example the analysis server 32, can transmit data through the internet 51, ISP 50, local network 48 and communication interface 46.

Figure 4:
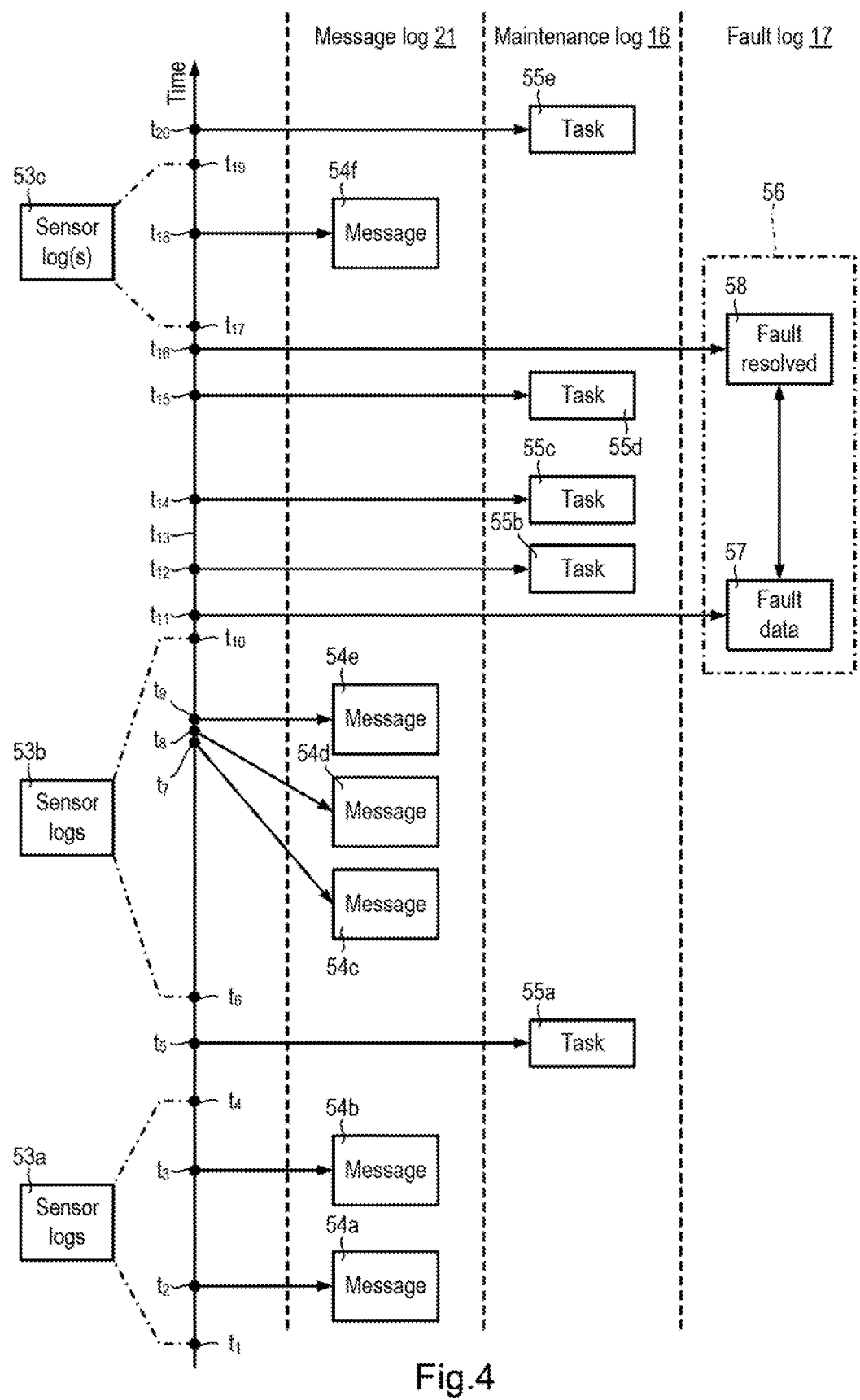
FIG. 4 schematically illustrates a timeline correspondence between data from different data sources.

Referring also to FIG. 4, an example timeline for a machine 15 in the form of a ship 15a will explained with reference to the corresponding message log 21, maintenance log 16, fault log 17 and a number of sensor logs 53.

Each sensor log 53 (e.g., 53a, 53b, 53c) may include a time series of parameter values measured by one or more sensors 19. The sensors 19 may include all of the sensors 19 on the ship 15a, all the sensors 19 associated with one or more subsystems 18, or any other combination of sensors 19. A sensor log 53 may include parameter values measured by a single sensor 19. Parameter values measured by one or more sensors 19 may be measured at equal intervals, or may be measured in response to triggering messages or events. Each sensor 19 may measure parameter values at a rate or interval specific to that sensor 19, to a type of sensor 19 or to a sub-system 18.

A first voyage commences at time $t_1$ and lasts until time $t_4$. The duration of a voyage $t_4$-$t_1$ may vary considerably depending upon the type of ship 15a. In one example, the ship 15a may be a passenger or vehicle ferry which carries out regular, scheduled voyages between a two or more relatively close ports/docks such as, for example, Dover and Calais, Dublin and Liverpool and so forth. In this example, the duration of a voyage $t_4$-$t_1$ may range from less than hour up to several days. Scheduled slots for preventative maintenance may be every day, or every week. Scheduled preventative maintenance may be conducted in one or more of the ports, and it may not be necessary to conduct preventative maintenance during the actual voyage.

In other examples, the ship 15a may be a long distance cargo ship or tanker, and the duration of a voyage $t_4$-$t_1$ may be weeks or months. In this example, preventative maintenance during the voyage cannot be avoided in practice. When the ship 15a is a long distance cargo ship or tanker, preventative maintenance may be split into regular maintenance conducted during voyages, and longer and/or more substantial maintenance slots between voyages. The range and type of maintenance tasks which may be conducted during a voyage may be restricted by the available facilities, consumables, spare parts, operational requirements and so forth.

In the example shown in FIG. 4, the ship 15a is a passenger and/or vehicle ferry which performs regular crossings of a relatively narrow body of water, for example a voyage may take several hours. In the example shown in FIG. 4, regular maintenance is scheduled to occur between voyages. The corresponding parameter values measured by all or a subset of the sensors 19 during the first voyage are stored as a first sensor log 53a. Alternatively, separate first sensor logs 53a may be stored for each sub-system 18 or separate first sensor logs 53a may be stored for each sensor 19. During the first voyage, a first message object 54a is generated by a sub-system 18 and stored in the message log 21, along with the corresponding time t2 and optionally other contextual information such as an identifying number for the voyage. A message object 54 (e.g., 54a, 54b, 54c, 54d, 54e, 54f) may include a message identity (ID) code consisting of letters and/or numbers. The message ID code may correspond to an entry in a look-up table providing further details. For example, a message ID code may take the form A-M-001, in which the letter "A" denotes an origin of the corresponding message object 54 in a first, or "A", sub-system 18, the letter "M" denotes that the message ID code corresponds to a message and should be looked up in a message look-up table, and the numeric code "001" denotes a first entry corresponding to the first sub-system 18 in the message look-up table. The corresponding entry in the message look-up table provides details of the message. The look-up table may be included in the manufacturer information 26, for example in a maintenance manual. Similarly, a message ID code of B-M-023 would identify a message object 54 originating in a second, or "B", sub-system 18 and so forth.

A second message object 54b is generated during the first voyage at time t3 and stored in the message log 21. Message object 54 contents may correspond to, for example, warnings and/or faults. Message object 54 contents may be determined by looking up message ID codes in a message look-up table. A message object 54 may correspond to the illumination of a warning light on the bridge, or illumination of a warning light elsewhere in or on the ship 15a, for example in the engine room.

A second voyage starts at time t6 and finishes at time $t_{10}$, and corresponding sensor 19 measurements are stored in one or more second sensor logs 53b, in the same way as the first sensor log(s) 53a. Between the first and second voyages, at a time $t_5$, a first maintenance task object 55a is recorded in the maintenance log 16 for the ship 15a. The first maintenance task object 55a may include information such as the time, $t_5$, and a maintenance task identity (ID) code consisting of letters and/or numbers. The maintenance task ID code may correspond to an entry in a look-up table providing further details. For example, a maintenance task ID code may take the form A-T-003, in which the letter "A" denotes a maintenance task carried out on a first, or "A", sub-system 18, the letter "T" denotes that the maintenance task ID code corresponds to a maintenance task and should be looked up in a maintenance task look-up table, and the numeric code "003" denotes a third entry corresponding to the first sub-system 18 in the maintenance task look-up table. The corresponding entry in the maintenance task look-up table provides details of the maintenance task which is carried out. The look-up table may be included in the manufacturer information 26. The first maintenance task object 55a may include further information such as, for example, free-text notes or descriptions of the maintenance task performed, details of any parts replaced, information about the engineer or mechanic responsible for carrying out the maintenance task and so forth. The first maintenance task object 55a is not occasioned by a fault, and corresponds to regular, or preventative, maintenance.

A third voyage is scheduled to start at a time $t_{13}$. However, the start time of the third voyage is delayed until $t_{17}$ due to a fault object 56 which is registered at a time $t_{11}$, shortly after the end of the second voyage at time $t_{10}$. The fault object 56 may correspond to a fault which is discovered following, for example, inspection by the ship crew or port staff, analysis of the second sensor log 53b, or the fault may have been indicated by third to fifth message objects 54c, 54d, 54e, which were recorded in a cluster at times $t_7$, $t_8$ and $t_9$. The fault object 56 is recorded in the fault log 17. The fault object 56 includes fault data 57 indicating the time corresponding to the fault object 56, details about the type of fault, the location of the ship 15a when the fault was registered and so forth. The fault data 57 may also include a fault identity (ID) code consisting of letters and/or numbers. The fault ID code may correspond to an entry in a look-up table providing further details. For example, a fault ID code may take the form C-F-012, in which the letter "C" denotes a fault arising in a third, or "C", sub-system 18, the letter "F" denotes that the fault ID code corresponds to a fault type and should be looked up in a fault type look-up table, and the numeric code "012" denotes a twelfth entry corresponding to the third sub-system 18 in the fault type look-up table. The corresponding entry in the fault type look-up table provides details of the fault type which has occurred. The fault type look-up table may be included in the manufacturer information 26.

Sometimes a fault corresponding to a fault object 56 may be readily rectified. On other occasions, the root cause of a fault corresponding to a fault object 56 in a ship 15a, or a fault in another machine 15, may be difficult to determine. Consequently, an engineer or mechanic may conduct one or more maintenance tasks which fail to resolve the fault. For example, both the second and third maintenance tasks objects 55b, 55c, started at times $t_{12}$ and $t_{14}$ respectively, both corresponding to maintenance tasks which failed to resolve the fault corresponding to the fault object 56. The fourth maintenance task object 55d, started at time $t_{15}$, corresponds to a maintenance task which did resolve the fault corresponding to the fault object 56. When the fault corresponding to the fault object 56 is verified to have been solved, fault resolution data 58 is added to the fault object 56 in the fault log 17. The fault resolution data 58 is linked to the fault data 57. The fault resolution data 58 may include information such as the end time of fault, for example $t_{16}$, and the maintenance task object 55d corresponding to the maintenance task which resolved the fault corresponding to the fault object 56.

Once the fault corresponding to the fault object 56 is resolved, the delayed third voyage starts at a time $t_{17}$ and ends at a time $t_{19}$. A sixth message object 54f is generated during the third voyage, at time $t_{18}$, but the sixth message object 54f does not indicate a new fault or a recurrence of the earlier fault corresponding to fault object 56. Regular or preventative maintenance, in the form of a maintenance task detailed by a fifth maintenance task object 55e, is conducted after the third voyage at a time $t_{20}$.

It will be appreciated that the sequence of events described in relation to FIG. 4 is for illustrative purposes only, and that the contents of the present specification may be applied to other sequences of events. For example, in the case of a ship 15*a* which a long distance cargo ship or tanker, voyages may last for weeks or even months, and so sensor logs 53 corresponding to the entire voyage may be inappropriate. Instead, sensor logs 53 for a ship 15*a* which a long distance cargo ship or tanker may be analysed according to shorter time periods, for example, daily, hourly or substantially in real time. Furthermore, in the case of a ship 15*a* which a long distance cargo ship or tanker, maintenance tasks 55 (e.g., 55*a*, 55*b*, 55*c*, 55*d*, 55*e*) corresponding to preventative maintenance and/or fault resolution may also be conducted during a voyage.

Message logs 21 may be populated in real time, i.e. message objects 54 generated by a machine 15 such as a ship 15*a* may be stored to a corresponding message log 21 at the same time, or shortly after, each message object 54 is generated. Maintenance logs 16 and fault logs 17 may be updated after the relevant events, for example, by filling in an electronic document or by scanning a paper document and so forth.

Statistical metrics may be derived from the parameter values measured by sensors 19. For example, if a parameter value does not vary substantially over time, simple time series statistics may be applied to derive a mean value, a standard deviation, a minimum and a maximum value for each type of parameter value included in a sensor log 53. Average, or baseline, values may be obtained by aggregating a large number of sensor logs 53 corresponding to a number of different machines 15 and different operations of the machines 15. For example, when the machines 15 are ships 15*a*, each operation may correspond to a different voyage, and when the machines 15 take form of construction machinery 15*b* (FIG. 11) each operation may correspond to a different journey, a work order, a lease period, or a fixed period of time such as one working day. Deviations of measured parameter values from the average values may be used as statistical metrics for analysis by the data fusion system 1.

Figure 5:
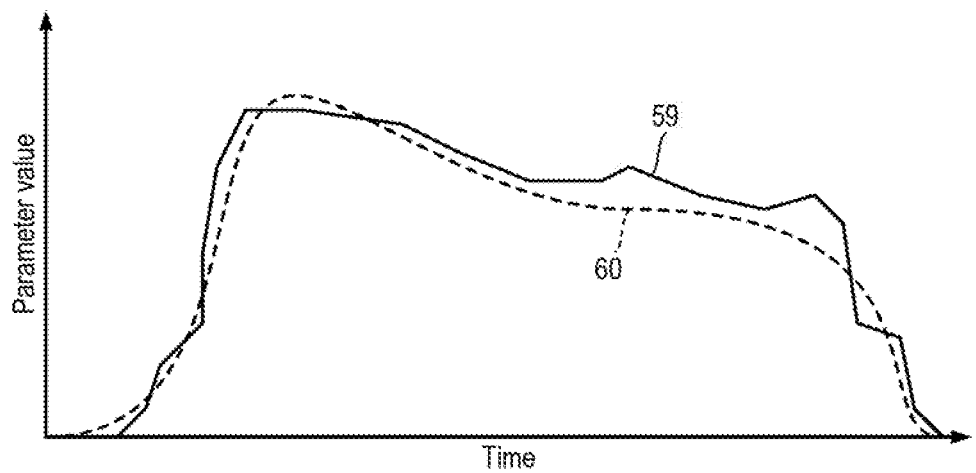
FIGS. 5 and 6 illustrate determining statistical metrics from measured parameter values.
Figure 11:
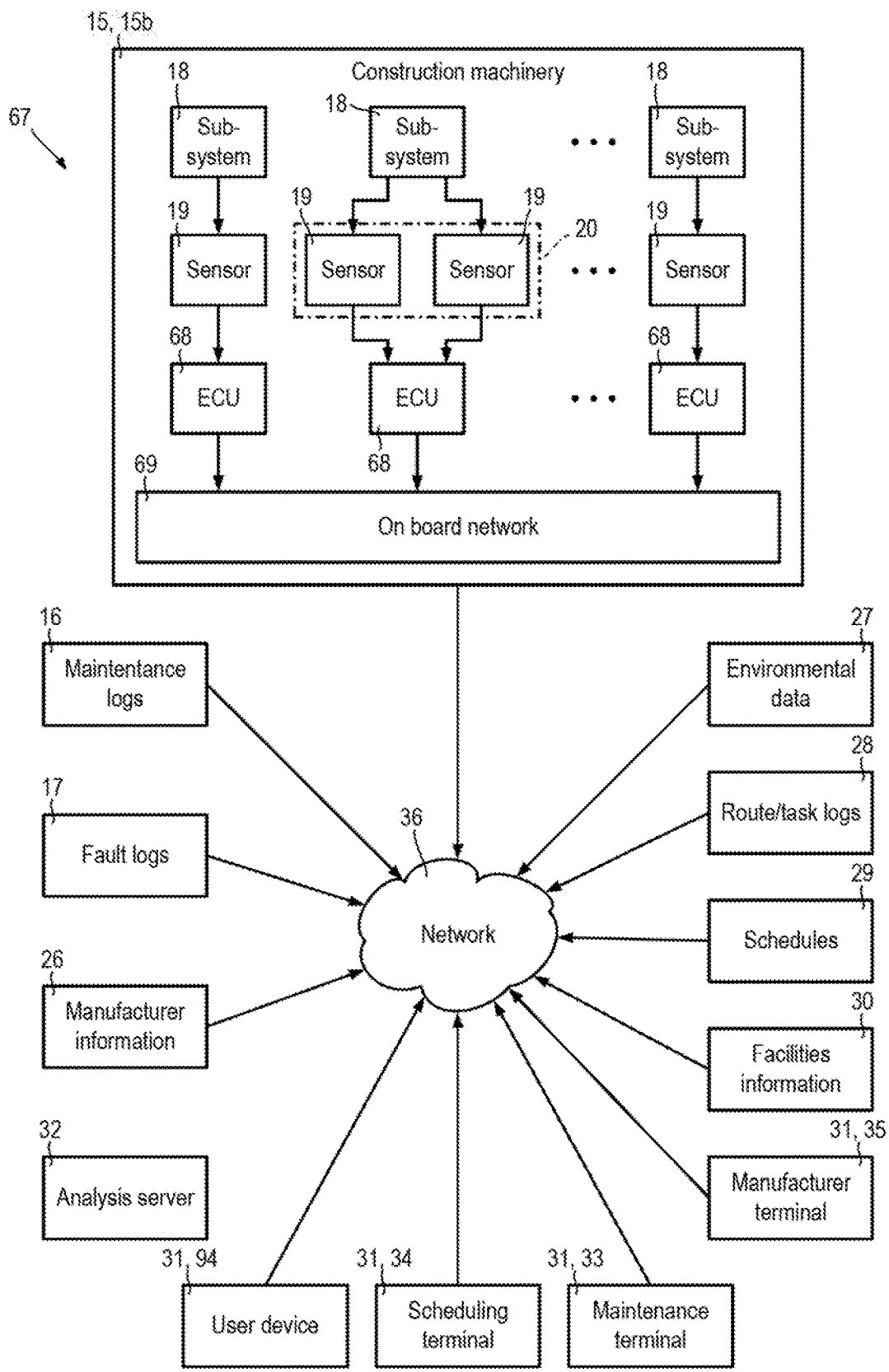
FIG. 11 is a block diagram of a second exemplary system according to embodiments of this specification for analysing and/or modelling a machine.

Referring also to FIG. 5, the values of some parameters measured by sensors 19 will vary with time, for example, over the course of a voyage when the machine 15 is a ship 15*a* or throughout a working day of construction machinery 15*b* (FIG. 11). The parameter values may be plotted against time as a parameter curve 59. By aggregating a large number of sensor logs 53 corresponding to a number of different machines 15 and different operations, a mean value, a standard deviation, a minimum and a maximum value of a the parameter may be determined as a function of time. The averaged parameter values may be plotted against time as an average parameter curve 60. Suitable statistical metrics may be calculated such as, for example, the mean and standard deviation of a difference between the parameter curve 59 and the average parameter curve 60. Minimum and maximum differences may also be used as statistical metrics. The difference between the parameter curve 59 and the average parameter curve 60 may be quantified using a hidden Markov model. The same approach may be used to determine statistical metrics based on a difference between first and second parameter curves stored in first and second sensor logs 53. Average parameter curves 60 (and related average statistical metrics) may be updated to take account of new sensor logs 53 by re-calculating average parameter curves 60 (and related average statistical metrics) according to a schedule, for example, daily or weekly. Alternatively, if sensor logs 53 are extracted from the machines 15 at periodic intervals, then the average parameter curves 60 (and related average statistical metrics) may be re-calculated immediately after new sensor logs 53 have been extracted.

Parameter curves 59 need not be plotted against time. Instead, a parameter curve 59 corresponding to a first parameter measured by a first sensor 19 may be plotted against a second parameter measured by a second sensor 19. Statistical metrics and average parameter curves 60 may be calculated in the same way. Analysing a pair of parameters can be useful in diagnosing a developing fault or issue. For example, in a normally functioning diesel engine, the stable operating temperature may vary with the revolutions per minute (RPM) according to a characteristic parameter curve, for example an average parameter curve 59. If a parameter curve 59 significantly deviates from the average parameter curve 60, for example, if the parameter curve 59 shows a faster than expected increase in temperature with RPM, this may indicate a developing fault in coolant levels or in a coolant system.

Figure 6:
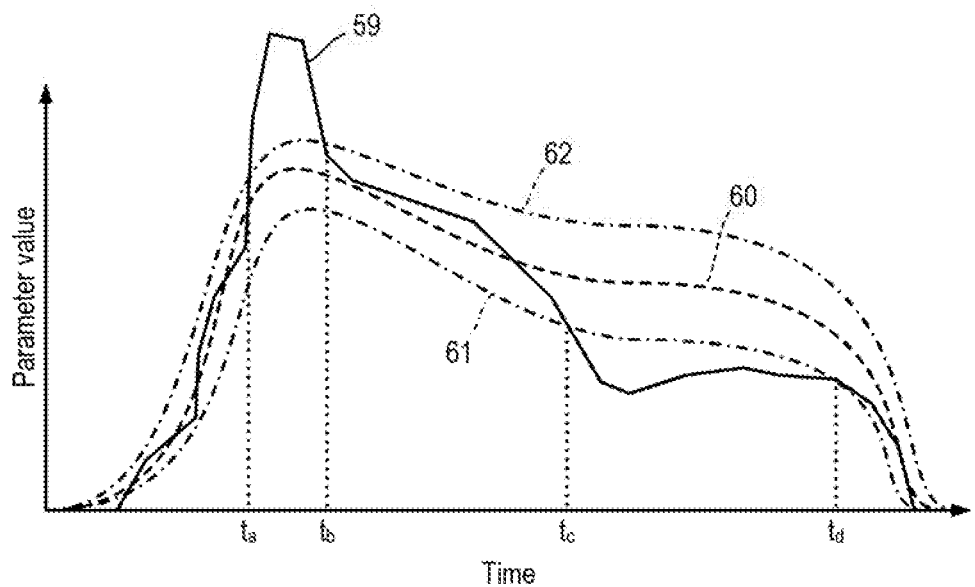

Referring also to FIG. 6, additional statistical metrics may be derived from the sensor logs 53. For example, the number and duration of intervals during which the parameter curve 59 differs from the average parameter curve 60 by more than a threshold amount may be calculated and used as a metric. For example, the number and duration of intervals during which the parameter curve 59 lies below the $25^{th}$ percentile 61 or above the $75^{th}$ percentile 62 may be recorded. In the example shown in FIG. 6, the parameter curve 59 exceeds the $75^{th}$ percentile 62 for a first interval $t_b$-$t_a$ and dips below the $25^{th}$ percentile 61 for a second interval $t_d$-$t_c$. A Schmidt trigger may be used, for example at the $75^{th}$ and $80^{th}$ percentiles, to determine that the parameter curve 59 has exceeded a specified tolerance.

Other thresholds may be used such as, for example, whether the parameter curve 59 deviates from an average parameter curve 60 by more than a multiple of a standard deviation $\sigma$. For example, instead of the $75^{th}$ percentile 62, an upper threshold may be the average parameter curve 60 plus $3\sigma$, and instead of the $25^{th}$ percentile 61, a lower threshold may be the average parameter curve 60 minus $3\sigma$. The standard deviation $\sigma$ may in general be a function of time or of a second parameter.

For machines 15 such as ships 15*a* or construction machinery 15*b* (FIG. 11), many parameters will vary with time, but the duration of different sensor logs 53 need not be the same because each sensor log 53 corresponds to a different operation of the same machine 15 or of a different machine 15. This can prevent naïve aggregation of corresponding parameter values belonging to first and second sensor logs 53*a*, 53*b*. For example, one working day for construction machinery 15*b* (FIG. 11) will vary dramatically from a subsequent working day because construction machinery 15*b* may be used to perform slightly different tasks and the duration and loading of each task may also vary from day to day. Sensors 19 recording parameters of a machine 15 may record datasets corresponding to two or more tasks or occasions which differ to the extent that direct comparison is difficult or meaningless. Such difficulties may be overcome by applying a dynamic time warping algorithm to the sensor logs 53.

Figure 7:
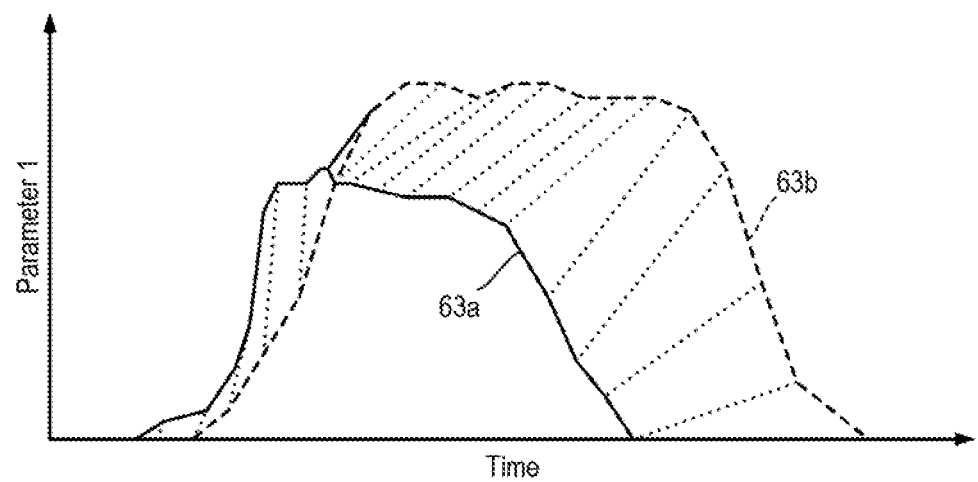
FIGS. 7 and 8 illustrate application of dynamic time warping to allow comparison between first and second curves of a first parameter.
Figure 8:
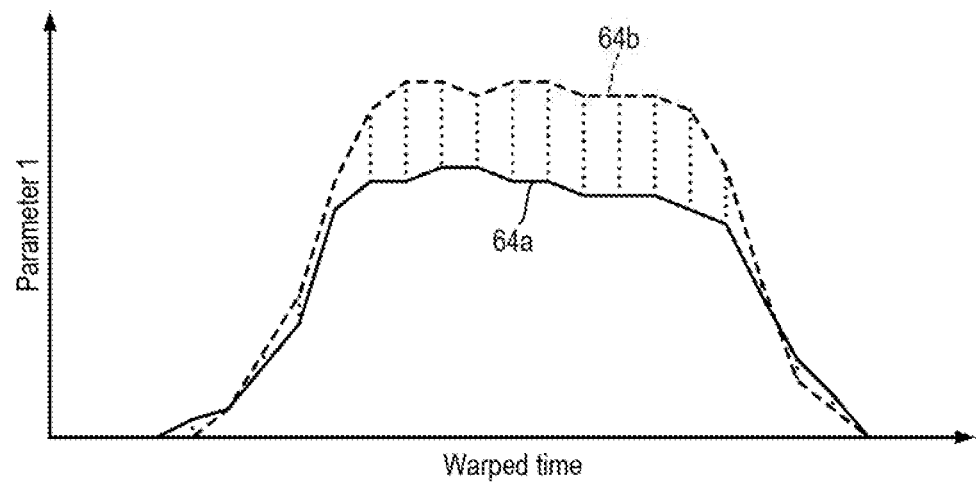

Referring also to FIGS. 7 and 8, first and second curves 63*a*, 63*b* of a first parameter are not directly comparable because they have differing lengths. The first and second curves 63*a*, 63*b* correspond to first and second sensor logs 53*a*, 53*b* respectively. However, a dynamic time warping algorithm may be used to distort the relative time-bases so that first and second warped curves 64*a*, 64*b* of the first parameter may be compared. The first parameter may be a parameter having a well understood meaning, such as velocity of a ship 15a, or the velocity and/or engine revolutions per minute (RPM) of construction machinery 15b (FIG. 11). Suitable first parameters may often correspond to the external state of a machine 15, for example, to ambient conditions or to a task which the machine 15 is performing.

Figure 9:
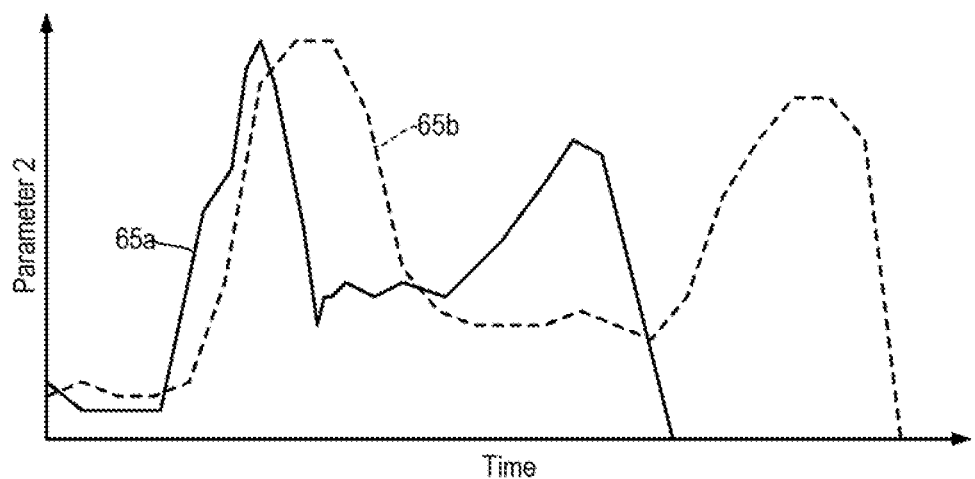
FIGS. 9 and 10 illustrate dynamic time warping of first and second curves of a second parameter based on the dynamic time warping of curves of the first parameter as shown in FIGS. 7 and 8.
Figure 10:
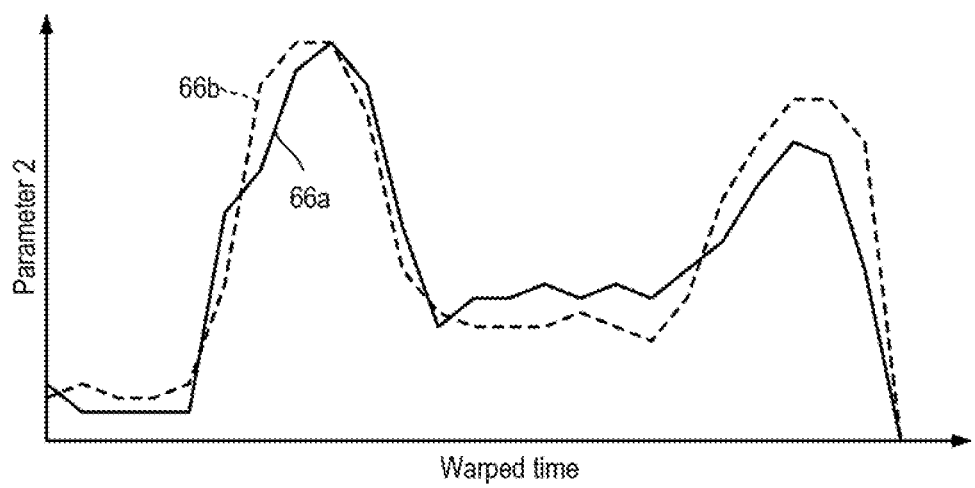

Referring also to FIGS. 9 and 10, first and second curves 65a, 65b of a second parameter may be less well understood or simply less suited to feature extraction. Such second parameters may relate more directly to the internal functioning or internal status of the machine 15. For example, when the machine 15 is a ship 15a, the second parameter may be a temperature of part of a gas turbine engine or a marine diesel engine. As another example, when the machine 15 is construction machinery 15b (FIG. 11), the second parameter may be the pressure of a pneumatic or hydraulic actuation system. Parameters relating to the internal functioning or internal status of the machine 15 may have less predictable or less regular features, which can complicate or prevent the direct application of a dynamic time-warping algorithm, which may lead to erroneous outputs. This issue can be avoided by generating warped curves 66a, 66b of the second parameter based on a warped time-frame established using the curves 63a, 63b of the first parameter. For example, if the machine 15 is a ship 15a or construction machinery 15b, parameters such as engine temperatures may be warped using a time-frame warping established based on parameters such as velocity or engine RPM of the ship 15a or construction machinery 15b.

By using an initial parameter curve as a reference, a large number of sensor logs 53 corresponding to a large number of different machines 15 and operations may be warped, then aggregated to obtain a mean value, a standard deviation, a minimum and a maximum value of each parameter to be determined for the purpose of calculating statistical metrics. Similarly, a large number of sensor logs 53 corresponding to a large number of different machines 15 and operations may be warped, then aggregated to obtain warped average parameter curves.

Log metrics may be determined using the computer readable logs corresponding to each machine 15. For example, when the machine 15 is a ship 15a, metrics may be determined based on the maintenance log 16, fault log 17, message log 21, crew log 22 and bridge log 23 corresponding to each ship 15a, as well as any environmental data 27, route/task logs 28 and so forth. For example, keyword searching may be used to establish frequencies of occurrence of particular words or phrases during one or more time intervals. Additionally or alternatively, when the message objects 54 include message ID codes, the maintenance task objects 55 include maintenance task ID codes and/or the fault objects 56 include fault ID codes, log metrics may be determined in the form of frequencies of occurrence of each message ID code, maintenance task ID code and/or fault ID code during one or more time intervals.

Additionally, ontology 5 may include semantic rules allowing natural language processing of computer readable logs, such as the maintenance logs 16, fault logs 17, message logs 21, crew logs 22, bridge logs 23, environmental data 27, route/task logs 28 and so forth. Natural language processing may enable determination of other log metrics.

It will be appreciated that many different examples of statistical metrics and metrics derived from computer readable logs may be used with the data fusion system 1, depending on the data sources 2 which are used.

Referring also to FIG. 11, a block diagram of a second exemplary system 67 for performing one or more operations for analysing and/or modelling a machine 15 is shown. In the second system 67, the machine 15 is construction machinery 15b and the second system 67 can include one or more construction machines 15b. The second system 67 may be used to help managing a fleet of construction machines 15b which are made available for leasing, or to manage all of the construction vehicles associated with a particular construction project. Construction machinery 15b may include be vehicles such as, for example, bulldozers, diggers, cranes, tractors, combine harvesters and so forth. Each construction machine 15b has a corresponding maintenance log 16 and fault log 17. The maintenance log 16 for a construction machine 15b may include information such as dates and locations of maintenance, details of replacement parts, free text notes made by an engineer or mechanic performing a maintenance task and so forth. The fault log 17 for a construction machine 15b may include information such as dates and locations of faults, the type of fault, the period of time required to rectify the fault and so forth. The maintenance logs 16 and fault logs 17 are stored in suitable computer readable formats or structures, such as XML files, database tables, and so forth. The maintenance log 16 and fault log 17 corresponding to a construction machine 15b may be stored on one or more servers and/or locally on the construction machine 15b itself. Maintenance logs 16 and fault logs 17 corresponding to a number of different construction machines 15b may be stored in a common database, for example database 7.

A construction machine 15b includes a number of sub-systems 18 which may be mechanical systems, electrical systems, computer systems or combinations thereof. Sub-systems 18 of a construction machine 15b may be controlled by one or more corresponding electronic control units 68 (ECUs), and the ECUs 68 of a construction machine 15b are interconnected for communications by an on-board network 69. Each sub-system 18 may include one or more sensors 19 which monitor corresponding physical parameters of the sub-system 18. One or more sensors 19 associated with a sub-system 18 form a sensor group 20. Examples of sensors 19 include a temperature sensor, a pressure sensor, an electrical current or voltage sensor, a gas concentration sensor, a strain gauge, and so forth. Data from sensors 19 may be stored on the construction machine 15b and subsequently transmitted or downloaded from the construction machine 15b according to a schedule, for example, upon arrival to a designated "home" location, daily or weekly. Data from some sensors 19 may be transmitted to a server via wireless networks operating at a storage location or operational location of a construction machine 15b. Data from some sensors 19 may be transmitted to a server via cellular networks during operation of a construction machine 15b. Sub-systems 18 connected via the on-board network 69 typically generate message objects 54 according to protocols which may be proprietary or standardised protocols. Information from a construction machine 15b may be extracted via a wireless connection or using a physical data port provided on the construction machine 15b.

Figure 12:
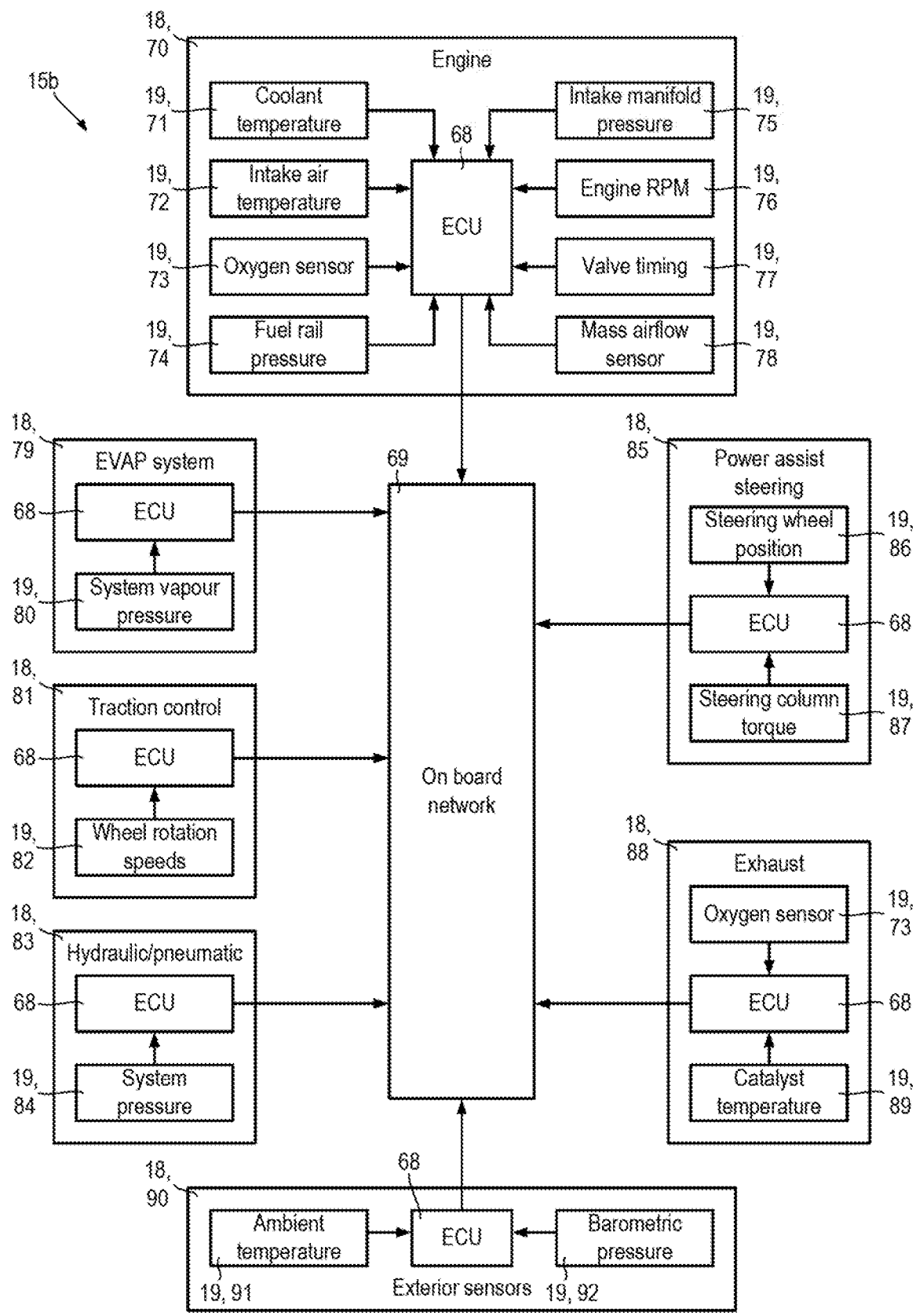
FIG. 12 is a block diagram illustrating sub-systems and sensors for construction machinery.

Referring also to FIG. 12, examples of construction machine 15b sub-systems 18 and associated sensors 19 are shown.

Many construction machines 15b include a diesel engine 70, which may include a large number of sensors 19 for use in regular operation, self-diagnostics, maintenance and/or repair. For example, a construction machine 15b diesel engine 70 may include, amongst other sensors 19, a coolant temperature sensor 71, an intake air sensor 72, one or more oxygen sensors 73 to monitor combustion efficiency, a fuel rail pressure sensor 74, an intake manifold gas pressure sensor 75, and engine RPM sensor 76, one or more valve timing sensors 77, a mass airflow sensor 78 and so forth.

Construction machines 15b may include an evaporative emissions control system 79 (EVAP system) including a vapour pressure sensor 80. Some construction machines 15b may include a traction control system 81 including wheel rotation speed sensors 82. Some construction machines 15b may include a hydraulic or pneumatic actuation system 83 including system pressure sensors 84, valve status sensors, load sensors and so forth, for controlling and monitoring actuation of tools such as a bull dozer scoop. Construction machines 15b may include a power assist steering system 85 including steering wheel position sensors 86 and steering column torque sensors 87. Construction machines 15b may include an exhaust system 88 including, for example, one or more oxygen concentration sensors 73 and one or more catalyst bed temperature sensors 89. Construction machines 15b may include exterior sensing systems 90 including sensors 19 such as, for example, ambient temperature sensors 91 and ambient barometric pressure 92 for determining the environmental conditions in which the construction machine 15b is operating.

The construction machine 15b may also store message logs 21 and global positioning system (GPS) (or other positioning system) logs 25. The message log 21 corresponding to a construction machine 15b may include message objects 54 generated by the ECUs 68, for example, according to OBD protocols. The message objects 54 may include a date and time, an identifier of an originating sub-system 18, and message contents such as, for example, a warning or fault identifier. Message logs 21 and global positioning system (GPS) logs 25 are stored in suitable computer readable formats or structures, such as XML files, database tables and so forth.

The second system 67 may also include manufacturer information 26 including, for example, databases providing information about messages and/or faults, suggested maintenance tasks, and manufacturer recommended tolerances for parameters measured by sensors 19. The second system 67 may also include environmental data 27 such as ambient temperatures, humidity and so forth, as a function of date, time and location. Such information may be relevant to predicting failure of construction machines 15b in a variety of ways. For example, a degraded battery system may not become evident to a user until it fails to supply sufficient current for a starter motor in colder ambient conditions. The degradation of the battery system may be detectable in sufficient time to allow replacement, however, whether or not battery replacement is the most critical preventative maintenance task may depend on the expected ambient temperatures. The second system 67 may also include a route/job log 28 corresponding to each construction machine 15b. The route/task log 28 for a construction machine 15b may include details of the start and end locations, routes traveled, dates and times of each journey, details of tasks assigned to the corresponding construction machine 15b and so forth. Route/task logs 28 may provide important contextual information for interpreting construction machine 15b sensor 19 data, for example, route information may be matched to elevation data to account for variations in engine power output of a tractor driving up or down a field located on an incline. The second system 67 may also include schedules 29 for the tasks which a fleet including a number of construction machines 15b need to be assigned to perform over a forthcoming time period. The second system 67 may also include facilities information 30 such as, for example, a type or class of available facilities at each location where a fleet of construction machines 15b operates or may operate. Examples of facilities information 30 may include locations of garages providing repair and/or re-fuelling, locations and availability of spare parts and/or geographical coverage and locations of breakdown recovery services.

The manufacturer information 26, environmental data 27, route/task logs 28, schedules 29 and facilities information 30 may be stored in suitable computer readable formats or structures, such as XML files, database tables, and so forth. The manufacturer information 26, environmental data 27, route/task logs 28, schedules 29 and facilities information 30 may be stored in one or more servers.

The maintenance logs 16, fault logs 17, sensors 19, message logs 21, GPS logs 25, manufacturer information 26, environmental data 27, route/task logs 28, schedules 29 and facilities information 30 are examples of data sources 2 for the data fusion system 1.

The second system 67 includes one or more analysis terminals 31 in the form of one or more computing systems 37.

The data fusion system 1 may be provided by one or more analysis servers 32 and one or more analysis terminals 31 may connect to the analysis server 32 as clients. Alternatively, each analysis terminal 31 may provide an example of the data fusion system 1. Examples of analysis terminals 31 may provide the same or different functions. For example, different analysis terminals 31 may be able to access different types of data or functions of the analysis server 32. For example, a scheduling terminal 34 may access data relating to risk model 6 outputs, schedules 29 and facilities information 30 to perform risk based scheduling of construction machine 15b tasks. As another example, a manufacturer terminal 35 may be given access to a reduced or redacted selection of data from the data sources 2, in order to allow monitoring and analysis of technical data whilst preserving the integrity of commercially sensitive information. A user device 94 such as a smartphone or tablet computer operated by the construction machine operator may also provide an analysis terminal 31 to enable the operator to receive timely and convenient notification of developing problems. In some examples, all analysis terminals 31 may access the same data and functions.

The analysis terminals 31 and analysis server 32 of the second system 67 communicate with the data sources 2 over a network 36 in the same way as the first system 14.

The second system 14 may include a number of machines 15 in the form of construction machines 15b, and all of the construction machines 15b forming part of the second exemplary system 67 are the same or comparable to one another.

The present specification is not limited to machines 15 in the form of ships 15a or construction machines 15b in the form of vehicles such as, for example, bulldozers, diggers, cranes, tractors, combine harvesters and so forth. The present specification is equally applicable to machines 15 in the form of any other type of vehicle such as, for example, trains, and so forth.

The present specification is not limited to vehicular machines 15, and may instead be applied to any type of machine 15 which includes sensors 19. For example, the present specification may be applied to sewage treatment equipment such as a sewage treatment plant. Unscheduled stoppages of a sewage treatment plant can be very expensive in lost time. A sewage treatment plant is typically extremely complex and tracing and identifying the origin of a fault or anomaly can be difficult and time consuming. Therefore, the teachings of the present specification in relation to data driven identification and rectification of the source of a fault can provide advantages for a sewage treatment plant.

In a sewage treatment plant operating conditions are intended to be relatively stable. The embodiments of the present specification relating to dynamic time warping and incorporation of computer readable logs to provide contextual information can allow the present specification to be particularly useful for applications in which machines 15 are operated in variable conditions and/or for variable tasks. For example, tunnel boring equipment is complex machinery which is operated in a range of different environments and under a range of mechanical loadings. Each location for tunnel boring will have a different geological constitution, so that loading of a boring bit will vary with depth and distance of the bore hole in a different way at each drilling location. Additionally, boring locations can be remote, so that obtaining spare parts may take a long time in the event of an unanticipated failure. If the spare parts ordered are not the correct parts to rectify a fault or anomaly, then any delay to boring operations may be compounded. Therefore, the teachings of the present specification in relation to data driven identification and rectification of the source of a fault can provide advantages for tunnel boring equipment.

System for Rectifying Machine Anomalies and Faults

When a machine 15 develops a fault or behaves anomalously, it may be difficult to determine precisely what the root cause is and/or how to resolve the problem. This can lead to wasted time and/or wasted spare parts performing maintenance tasks which do not resolve the fault or anomaly.

Figure 13:
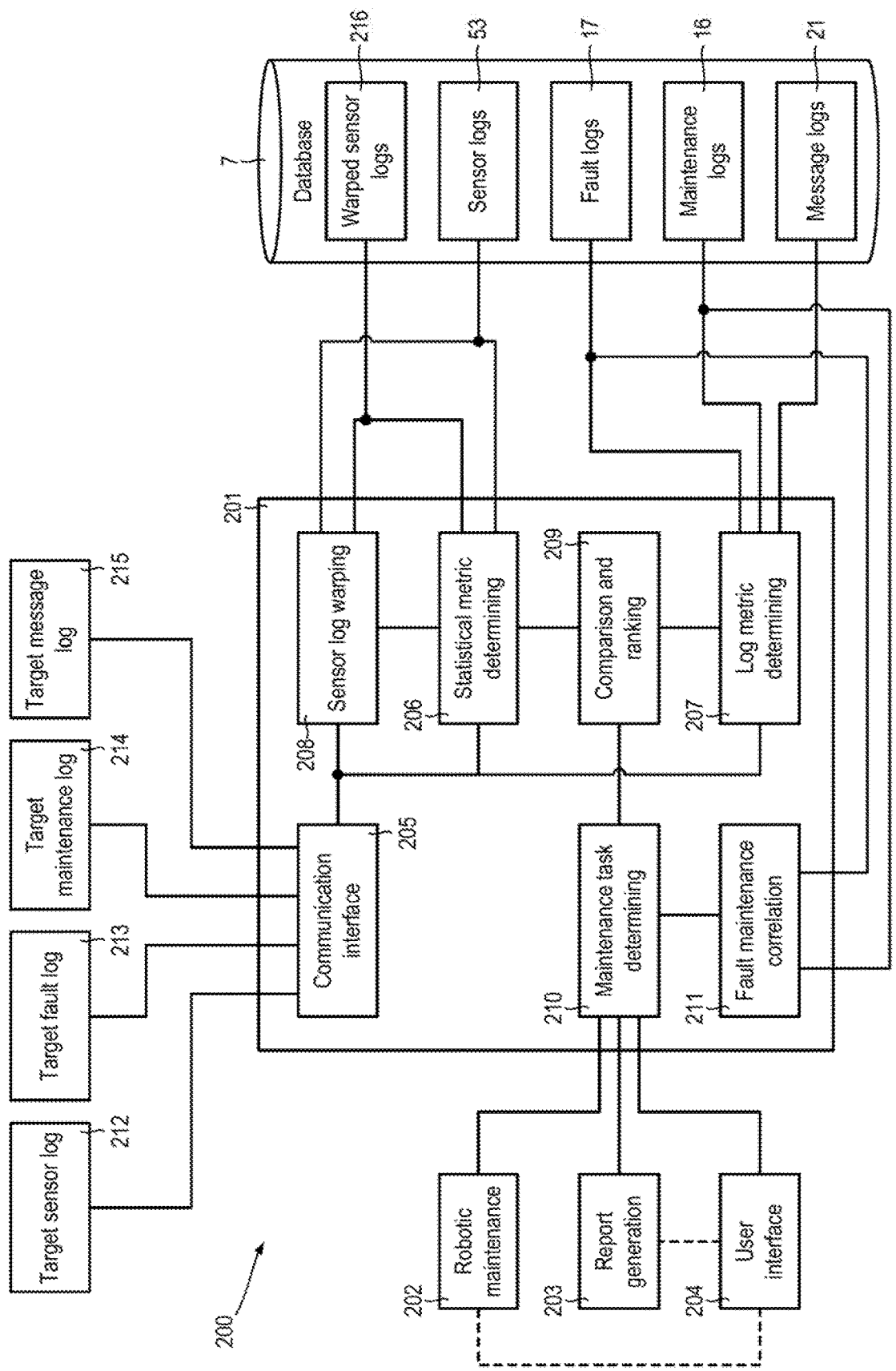
FIG. 13 is a block diagram of an apparatus according to embodiments of this specification for determining a maintenance task for a machine.

Referring also to FIG. 13, a system 200 for rectifying machine 15 anomalies and/or faults analyses history data corresponding to a machine 15 and can improve the efficiency of resolving a fault in, or anomalous behaviour of, the machine 15.

The system 200 for analysing machine 15 anomalies and faults includes a database 7, an apparatus 201 for analysing machine faults 15 and a robotic maintenance system 202. The system 200 may optionally include a report generation module 203 and/or a user interface 204. The system 200 is an example of a data fusion system 1. The system 200 may be provided by an analysis terminal 31 or an analysis server 32. The system may be provided by a computer system such as computer system 37.

The database 7 includes a number of sensor logs 53 corresponding to one or more machines 15. The machines 15 are of the same or corresponding types and each machine 15 includes the same or corresponding sub-systems 18 and sensors 19. Each sensor log 53 includes a time series of measured parameters measured by one or more sensors 19. For example, if machines 15 take the form of construction machines 15b including diesel engines, then the sensor logs 53 may include time series of measured parameters such as, for example, engine temperature, fuel injector pressure, exhaust catalyst temperature, exhaust oxygen concentration and so forth. In another example, if machines 15 take the form of ships 15a, sensor logs 53 may include time series of measured parameters such as, for example, speed, engine temperature, cabin and/or cargo area temperature, bilge level, torque on the propeller shafts, and so forth.

The database 7 includes a fault log 17 corresponding to each machine 15. Each fault log 17 is a computer readable log which includes a number of fault objects 56. Each fault object 56 includes fault data 57 specifying a time and a type of a fault (for example a fault ID code), and fault resolution data 58 specifying an end time or duration of the fault and, optionally, a maintenance task type (for example a corresponding maintenance task ID code) which resolved the fault.

The database 7 includes additional computer readable logs corresponding to each machine 15. The computer readable logs for each machine 15 include a maintenance log 16. Each maintenance log 16 includes a number of maintenance task objects 55, each maintenance task object 55 specifying a time, a maintenance task type (for example a corresponding maintenance task ID code) and optionally the duration of the maintenance task. Maintenance task objects 55 may also include locations at which a maintenance task was performed, details of replacement parts used and free text notes made by an engineer or mechanic performing the maintenance task.

The computer readable logs stored in the database 7 may include message logs 21. The message logs 21 corresponding to each machine 15 may include message objects 54 generated by controllers, processors or similar devices which are integrated into the various sub-systems 18 of the machine 15. The message objects 54 may include a date and time, an identifier of the originating sub-system 18 and message contents such as, for example, a message ID code or other message contents. A message object 54 may include content such as a fault ID code when the message is reporting a fault.

The database 7 contents are stored in suitable computer readable formats or structures, such as XML files, database tables, and so forth. The database 7 may be locally stored on one or more storage devices. Alternatively, the database may be stored on one or more servers in networked communication with the apparatus 201 for analysing machine 15 faults.

The apparatus 201 for rectifying machine 15 faults includes a communication interface 205, a statistical metric determining module 206, a log metric determining module 207, a sensor log warping module 208, a comparison and ranking module 209, a maintenance task determining module 210 and a fault maintenance correlation module 211.

The communication interface 205 receives a target sensor log 212. The communication interface 205 may also receive a target fault log 213, a target maintenance log 214 and a target message log 215. The target logs 212, 213, 214, 215 correspond to a machine 15, for example a first machine, which has developed an anomaly and/or a fault. For example, the target sensor log 212 may correspond to a journey or a working day of a ship 15a or a construction machine 15b. An anomaly may correspond to values of one or more sensors 19 which differ from average values by more than a threshold amount. A fault may be indicated by a message object 54 generated by a controller of a sub-system 18 and alerting that a fault has occurred. A fault may correspond to the machine 15 being inoperable.

The statistical metric determining module 206 receives the target sensor log 212 and accesses sensor logs 53 stored in the database 7. Alternatively, the target sensor log 212 need not be received via communication interface 205, and the target sensor log 212 may instead be accessed from the database 7. In this case, the apparatus 201 receives anomaly information or fault information which is sufficient to allow the target logs 212, 213, 214, 215 to be identified within the database 7.

The statistical metric determining module processes the target sensor log 212 and sensor logs to determine statistical metrics. Referring again to FIG. 5, the statistical metric determining module 205 determines the mean, standard deviation minimum and/or maximum of a difference between a first parameter curve corresponding to the target sensor log 212 and a second parameter curve corresponding to another sensor log 53. The first parameter curve and second parameter curve may be quantitatively ranked in terms of similarity using the output of a hidden Markov model. The sensor logs 53 may correspond to other machines 15 and also to previous operations of the machine 15 corresponding to the target sensor log 212. The statistical metric determining module 205 may determine statistical metrics comparing the target sensor log 212 against all the other sensor logs 53 in the database. The statistical metrics determined in this way may be used to identify which of the sensor logs 53 most closely match the target sensor log 212 corresponding to the anomalous behaviour.

The statistical metric determining module 206 may also determine statistical metrics based on warped sensor logs 216. For example, referring again to FIGS. 7 to 10, the sensor log warping module 208 may receive the target sensor log 212, retrieve the sensor logs 53 and generate warped sensor logs 216 (for example warped curves 56) as described hereinbefore with reference to FIGS. 7 to 10. The sensor log warping module 208 may warp each sensor log 53 with reference to the target sensor log 212. The statistical metric determining module 206 may determine statistical metrics based on the warped target sensor log and the warped sensor logs 216 in the same way as for the target sensor log 212 and sensor logs 53.

The warped sensor logs 216 may be determined in advance and stored separately in the database 7. If the database 7 stores warped sensor logs 216 corresponding to each sensor log 53, then each is warped to a single, common time-frame. In such an example, the sensor log warping module 208 may warp the target sensor log 212 to generate a warped target sensor log spanning the same common time-frame. Previously stored warped sensor logs 216 may be retrieved and processed by the statistical metric determining module 206 in the same way as sensor logs 53.

When analysing a fault of a machine 15, the accessed sensor logs 53 may be limited to sensor logs 53 which correspond to a fault log 17 which includes a fault object 56 within an interval following the sensor log 53. The interval may be pre-determined or user determinable. The accessed sensor logs 53 may be limited to sensor logs 53 which correspond to the same fault type (for example fault ID code) as a target fault object 56 of the target fault log 213. Alternatively, the accessed sensor logs 53 may be limited to sensor logs 53 which correspond to a fault type which is associated with the same sub-system 18 as the target fault object 56 of the target fault log 213.

Additionally or alternatively, the statistical metric determining module 206 may determine the mean, standard deviation, minimum or maximum of a difference between a parameter curve corresponding to the target sensor log 212 or another sensor log 53 (for example parameter curve 59) and an average parameter curve (for example average parameter curve 60) determined by aggregating a large number of sensor logs 53 across a number of different machines 15 and/or operations of the machines. The difference between a parameter curve corresponding to the target sensor log 212 or another sensor log 53 (for example parameter curve 59) and an average parameter curve (for example average parameter curve 60) may be quantified based on the output of a hidden Markov model. The average parameter curves may be determined in advance and stored separately in the database 7. Alternatively, average parameter curves may be determined based on a number of sensor logs 53 and used to determine statistical metrics for the target sensor log 212 and the sensor logs 53.

Average warped curves may be determined in advance and stored separately in the database 7 in the same way as average parameter curves. Alternatively, a number of warped sensor logs 216 may be determined by the sensor log warping module 208 and received directly by the statistical metric determining module 206 in order to determine an average warped curve. Statistical metrics may be determined using average warped parameter curves in the same way as for average parameter curves.

The log metric determining module 207 receives the target fault log 213, target maintenance log 214 and target message log 215, and accesses faults logs 17, maintenance logs 16 and message logs 21 stored in the database 7. Alternatively, the target fault log 213, target maintenance log 214 and target message log 215 need not be received via communication interface 205. The target fault log 213, target maintenance log 214 and target message log 215 may instead be accessed from the database 7. In this case, the apparatus 201 receives anomaly information or fault information which is sufficient to allow the target logs 212, 213, 214, 215 to be identified within the database 7. The accessed computer readable logs 16, 17, 21 are limited to those which correspond to a fault log 17 which includes a fault object 56 which has the same fault type (for example fault ID code) as a target fault object 56 of the target fault log 213. Alternatively, the accessed computer readable logs 16, 17, 21 may be limited to those which correspond to a fault type which is associated with the same sub-system 18 as the target fault object 56 of the target fault log 213.

The log metric determining module 207 receives target computer readable logs 213, 214, 215, accesses the computer readable logs 16, 17, 21 and determines log metrics based on the maintenance logs 16, 214, fault logs 17, 213 and optionally message logs 21, 215. Where the target computer readable logs 213, 214, 215 and/or computer readable logs 16, 17, 21 include free-text information, the log metric determining module 207 may perform keyword searching to establish frequencies of occurrence of particular words or phrases during one or more time intervals. Frequencies of occurrence of particular words or phrases in the computer readable logs 16, 17, 21 and/or target computer readable logs 213, 214, 215 during one of more time intervals may be used as log metrics. The log metric determining module 207 may employ natural language processing to determine patterns in free-text information. Additionally or alternatively, message objects 54, maintenance task objects 55 and fault objects 57 may include respective ID codes (for example ID codes identifying corresponding maintenance task types, faults types or message types), and frequencies of occurrence of the ID codes in the computer readable logs 16, 17, 21 213, 214, 215 during one of more time intervals may be used as log metrics.

The comparison and ranking module may determine, based on the statistical metrics, one or more sensor logs 53 which are comparable to the target sensor log 212 corresponding to an anomaly. Alternatively, the comparison and ranking module may determine, based on the statistical metrics and log metrics, one or more prior fault objects 56 stored in fault logs 17 which are comparable to a target fault object 56 stored in the target fault log 213.

For example, when analysing an anomaly, the comparison and ranking module 209 may receive the statistical metrics and determine a ranking of the sensor logs 53 based on how closely each matches the target sensor log 212. If there is one statistical metric, e.g. a mean difference between each other sensor log 53 and the target sensor log 212 based on measured values from a single sensor 19, then the ranking may be determined by sorting the sensor logs from lowest to highest mean difference. Alternatively, when the target sensor log 212 and the other sensor logs 53 each include two or more measured values at each time, a ranking metric may be used. A ranking metric may be calculated by combining multiple statistical metrics into a single value, for example, by summing the individual statistical metrics with or without weightings.

An alternative ranking metric may be determined by assigning a rank based on each individual statistical metric, where a rank of one is always given to the closest match. The ranks for each individual statistical metric of a particular sensor log 53 may be summed to provide a rank metric which will be a minimum for the closest match (according to this metric). In yet another example, the sensor logs 53 may be ranked according to a first statistical metric, with rank conflicts resolved using a second statistical metric and so forth, until each sensor log 53 has a unique rank.

The comparable sensor logs 53 may be determined as the sensor logs 53 which are ranked as closest to the target sensor log 212, for example, the comparable sensor logs 53 may include the ten closest to the target sensor log 212. Alternatively, the comparable sensor logs 53 may include the twenty closest, the fifty closest and so forth. In other examples, the comparable sensor logs 53 may include all sensor logs 53 having statistical metrics and/or ranking metrics which exceed a predefined threshold or user selectable threshold. Alternatively, the comparable sensor logs 53 may include all sensor logs 53 having statistical metrics and/or ranking metrics which are less than a predefined threshold or user selectable threshold.

As another example, when analysing a fault, the comparison and ranking module 209 may receive the statistical metrics and log metrics and determine a ranking of previously recorded fault objects 56 stored in fault logs 17, based on how closely each matches the target fault object 56 of the target fault log 213. This may include prior fault objects 56 from the target fault log 213 as well as other fault logs, since prior faults of the machine 15 which is currently experiencing a fault need not be excluded from the analysis. A ranking metric may be used. For example, a ranking metric may be calculated by combining multiple statistical metrics and log metrics into a single value using a function which takes the statistical metrics and log metrics as inputs and provides a single output value.

One example of a ranking metric may be obtained by summing the individual statistical metrics with or without weightings. An alternative ranking metric may be determined by assigning a rank based on each individual statistical metric and each individual log metric, where a rank of one is always given to the closest match. The ranks for each individual statistical metric and each individual log metric corresponding to a particular prior fault object 56 may be summed to provide a rank metric which will be a minimum for the closest match (according to this metric). In yet another example, the previous fault objects 56 may be ranked according to the statistical metrics derived from corresponding sensor logs 53, with rank conflicts resolved using the log metrics until each previous fault object 56 has a unique rank.

The comparable prior fault objects 56 may be determined as the prior fault objects 56 which are ranked as closest to the target fault object, for example, the comparable prior fault objects 56 may include the ten fault objects 56 ranked as the closest to the target fault object 56. Alternatively, the comparable prior fault objects may include the twenty closest, the fifty closest and so forth. In other examples, the comparable prior fault objects 56 may include all the relevant fault objects 56 having statistical metrics and/or ranking metrics which exceed a predefined threshold or a user selectable threshold. Alternatively, the comparable prior fault objects 56 may include all the relevant fault objects 56 having statistical metrics and/or ranking metrics which are less than a predefined threshold or a user selectable threshold.

The maintenance task determining module 210 may control the fault maintenance correlation module 211 to access and analyse the maintenance logs 16 corresponding to one or more comparable sensor logs 53 and/or one or more prior fault objects 56. The fault maintenance correlation module 211 provides interpretation between the maintenance task determining module 210 and the database 7.

For example, when analysing an anomaly, the maintenance task determining module 210 may control the fault maintenance correlation module 211 to access the maintenance logs corresponding to each comparable sensor log 53 and retrieve the maintenance objects 55 corresponding to times within an interval following that comparable sensor log 53. The interval may be predetermined or the interval may be specified by a user via the user interface 204. Alternatively, the fault maintenance correlation module 211 may retrieve the maintenance objects 55 which correspond to times after the comparable sensor log 53 and before the next sensor log 53 for the same machine 15 which is not one of the comparable sensor logs 53. In other words, the fault maintenance correlation module 211 may retrieve the maintenance objects 55 recorded between a similar prior anomaly and a time when that prior anomaly was rectified. The maintenance object 55 immediately preceding the rectification of the anomaly is a correlated maintenance object 55. A maintenance object 55 may include several maintenance tasks (for example having different maintenance task ID codes), and the most recent maintenance task recorded in the correlated maintenance object 55 is a correlated maintenance task. A further condition may be applied to determine a correlated maintenance task, namely, that the anomaly does not recur within an interval following the effective maintenance object 55, for example, no recurrence within 15 days.

For example, when analysing a fault, the maintenance task determining module 210 may control the fault maintenance correlation module 211 to access the maintenance logs corresponding to each comparable prior fault object 56 and retrieve the maintenance objects 55 corresponding to times between the fault start time recorded in the fault data 57 and the end time recorded by the fault resolution data 58. Alternatively, the maintenance task determining module 210 may control the fault maintenance correlation module 211 to access the maintenance logs corresponding to each comparable prior fault object 56 and retrieve the maintenance objects 55 corresponding to times within an interval following that prior fault object 56. The interval may be predetermined or the interval may be specified by a user via the user interface 204. The maintenance object 55 immediately preceding the rectification of the prior fault is the correlated maintenance object 55. A maintenance object 55 may include several maintenance tasks (for example having different maintenance task ID codes), and the most recent maintenance task recorded in the correlated maintenance object 55 is the correlated maintenance task. A further condition may be applied to determine an correlated maintenance task, namely, that the fault does not recur within an interval following the effective maintenance object 55, for example, no recurrence within 15 days.

The maintenance task determining module 210 may determine statistics for the correlated maintenance tasks. For example, the maintenance task determining module 210 may determine a number and a percentage of comparable sensor logs 53 or comparable prior fault objects 56 for which each correlated maintenance task was carried out. The maintenance task determining module 210 may also determine the identity and number of spare parts and/or consumables which were used in connection with each correlated maintenance task. The maintenance task determining module 210 selects a priority maintenance task from amongst the correlated maintenance tasks.

For example, when analysing an anomaly, the maintenance task determining module 210 may select the priority maintenance task as the maintenance task which is correlated to the most closely matched comparable sensor log 53, as determined by the ranking performed by the comparison and ranking module 209. Alternatively, the maintenance task determining module 210 may select the priority maintenance task based on the statistics for the correlated maintenance tasks. The maintenance task determining module 210 may select the priority maintenance task as the correlated maintenance task which was carried out for the largest percentage of comparable sensor logs 53.

For example, when analysing a fault, the maintenance task determining module 210 may select the priority maintenance task as the maintenance task which is correlated to the most closely matched comparable prior fault object 56, as determined by the ranking performed by the comparison and ranking module 209. Alternatively, the maintenance task determining module 210 may select the priority maintenance task based on the statistics for the correlated maintenance tasks. The maintenance task determining module 210 may select the priority maintenance task to be the correlated maintenance task which was carried out for the largest percentage of comparable prior fault objects 56.

The maintenance task determining module 210 outputs the priority maintenance task to the robotic maintenance system 202, which carries out the priority maintenance task.

Alternatively, the maintenance task determining module 210 may output the priority maintenance task to the report generation module 203, which prepares and outputs a physical report or work order to direct an engineer or mechanic to perform the priority maintenance task.

In other examples, the maintenance task determining module 210 may output the priority maintenance task to the user interface 204. The maintenance task determining module 210 may output further information to the user interface 204 such as, for example, the ranking of comparable sensor logs 53 or prior fault objects 56, a list of the correlated maintenance tasks, statistics for the correlated maintenance tasks and so forth. In some examples, the user interface 204 may be used to review and/or modify the selection of the priority maintenance task. One a user is satisfied with the selection of the priority maintenance task, they may provide a command via the user interface 204 for the robotic maintenance system 202 to carry out the priority maintenance task and/or a command for the report generation module 203 to prepare and output a physical report or work order.

In this way, decision making about how to proceed when a machine 15 develops a fault may be placed on a quantitative footing. By selecting a maintenance task in which has previously been found to effective in similar circumstances, the probability of repairing the faulty machine 15 without first performing ineffective maintenance tasks can be increased. Compared to working through maintenance tasks described in a manufacturer manual in a specific order, the system 200 enables an engineer or mechanic to proceed directly to maintenance tasks which are more likely to resolve an anomaly or fault.

Determining the identity and number of spare parts and/or consumables which were used in connection with correlated maintenance tasks enables an engineer or mechanic to ensure that the required spare parts and/or consumables or available before commencing maintenance on a machine 15. This enables better planning of maintenance operations.

The system 200 may be used with different types of machine 15, for example, the machine 15 may be an independent machine or a number of machines 15 may interoperate to provide a large, complex machine.

Further features of the apparatus 201 for analysing machine 15 faults shall become apparent from the description of methods hereinafter.

Method of Rectifying an Anomaly

Figure 14:
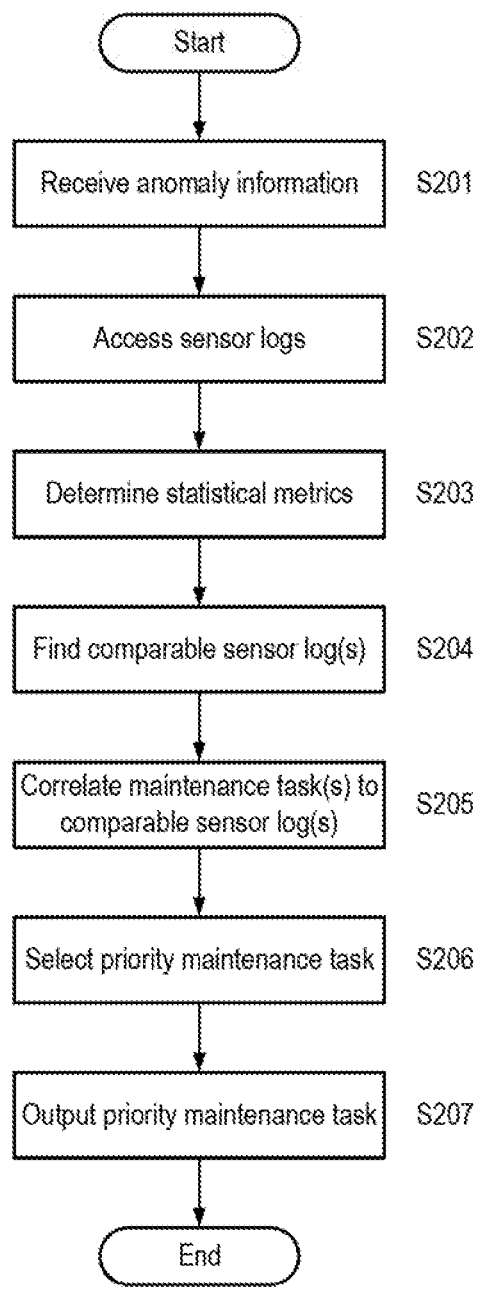
FIG. 14 is a process flow diagram of a method according to embodiments of this specification, the method for determining a maintenance task to resolve an anomaly of a machine.

Referring also to FIG. 14, a method of determining a maintenance task to rectify an anomaly in a machine 15 is explained. An anomaly may correspond to sensor logs 53 which include unusual sensor 19 measurements which deviate by more than a threshold amount from average or expected values. Such outlying sensor logs 53 may correspond to a machine 15 which is not performing as expected, or which may be in the process of developing a more serious fault. An anomaly may be detected by analysis of sensor logs 53 stored in the database. Alternatively, an anomaly may be detected because a controller of a sub-system 18 has sent a message object 54 having a message ID code corresponding to a warning of anomalous behaviour.

When a machine 15 is not operating correctly, it may be difficult to determine and rectify the root cause. One or more maintenance tasks may be carried out which fail to rectify the anomaly, resulting in wasted time and other resources such as consumables and/or spare parts. The method of determining a maintenance task to rectify an anomaly can help to improve the efficiency of rectifying anomalous behaviour of a machine 15 by identifying similar anomalies and correlating information about how the similar anomalies were previously rectified. This can allow ineffective maintenance tasks to be avoided and effective maintenance tasks to be carried out sooner.

Anomaly information identifying a machine 15 and one or more operations of that machine 15 are received (step S201). When the machine 15 is a construction machine 15b, an operation of the machine 15 may correspond to a journey or a working day. When the machine 15 is a ship 15a, an operation of the machine 15 may correspond to a voyage or a working day during a voyage.

For example, information identifying an anomaly may be a target sensor log 212 received via the communication interface 205. Alternatively, information identifying an anomaly may be information identifying one or more target sensor logs 53 stored in the database 7. Information identifying an anomaly may be received via the user interface 204.

Sensor logs 53 and/or warped sensor logs 216 stored in the database 7 are accessed (step S202). If the information identifying the anomaly was not a target sensor log 212 received via the communication interface 205, the target sensor log 212 is accessed from the database 7. The target sensor log 212 and sensor logs 53, and/or warped sensor logs 216 are compared to determine statistical metrics (step S203).

For example, the statistical metric determining module 206 receives the target sensor log 212 and accesses sensor logs 53 stored in the database 7 and processes them to determine statistical metrics. Referring again to FIG. 5, the statistical metric determining module 205 determines the mean, standard deviation minimum and/or maximum of a difference between a first parameter curve corresponding to the target sensor log 212 and a second parameter curve corresponding to another sensor log 53. The first parameter curve and second parameter curve may be quantitatively ranked in terms of similarity using the output of a hidden Markov model. The sensor logs 53 may correspond to other machines 15 and also to previous operations of the machine 15 corresponding to the target sensor log 212. The statistical metric determining module 205 determines statistical metrics comparing the target sensor log 212 against the other sensor logs 53 in the database. The statistical metrics determined in this way may be used to identify which of the sensor logs 53 most closely match the target sensor log 212 corresponding to the anomalous behaviour.

The statistical metric determining module 206 may also determine statistical metrics based on warped sensor logs 216. For example, referring again to FIGS. 7 to 10, the sensor log warping module 208 may receive the target sensor log 212, retrieve the sensor logs 53 and generate warped sensor logs 216 (for example warped curves 56) as described hereinbefore with reference to FIGS. 7 to 10. The sensor log warping module 208 may warp each sensor log 53 with reference to the target sensor log 212. The statistical metric determining module 206 may determine statistical metrics based on the warped target sensor log and the warped sensor logs 216 in the same was as for the target sensor log 212 and sensor logs 53.

The warped sensor logs 216 may be determined in advance and stored separately in the database 7. If the database 7 stores warped sensor logs 216 corresponding to each sensor log 53 warped to a single, common time-frame, then the sensor log warping module 208 may warp the target sensor log 212 to generate a warped target sensor log spanning the same common time-frame. Previously stored warped sensor logs 216 may be retrieved and processed by the statistical metric determining module 206 in the same way as sensor logs 53.

One or more sensor logs 53 which are comparable to the target sensor log 212 are determined based on the statistical metrics (step S204).

For example, the comparison and ranking module 209 may receive the statistical metrics and determine a ranking of the sensor logs 53 based on how closely each matches the target sensor log 212. For example, if there is one statistical metric, e.g. a mean difference between each other sensor log 53 and the target sensor log 212 based on measured values from a single sensor 19, the ranking may be determined by sorting the sensor logs from lowest to highest mean difference. Alternatively, when the target sensor log 212 and other sensor logs 53 each includes two or more measured values at each time, a ranking metric may be used. A ranking metric may be calculated by combining multiple statistical metrics into a single value, for example, by summing the individual statistical metrics with or without weightings. An alternative ranking metric may be determined by assigning a rank based on each individual statistical metric, where a rank of one is always given to the closest match. The ranks for each individual statistical metric of a particular sensor log 53 may be summed to provide a rank metric which will be a minimum for the closest match (according to this metric). In yet another example, the sensor logs 53 may be ranked according to a first statistical metric, with rank conflicts resolved using a second statistical metric and so forth until each sensor log 53 has a unique rank.

The comparable sensor logs 53 may be determined as the sensor logs 53 which are ranked as closest to the target sensor log 212, for example, the comparable sensor logs 53 may include the ten closest to the target sensor log 212. Alternatively, the comparable sensor logs 53 may include the twenty closest, the fifty closest and so forth. In other examples, the comparable sensor logs 53 may include all sensor logs 53 having statistical metrics and/or ranking metrics which exceed a threshold. Alternatively, the comparable sensor logs 53 may include all sensor logs 53 having statistical metrics and/or ranking metrics which are less than a threshold.

For each machine 15 corresponding to a comparable sensor log 53, the maintenance task objects 55 of the corresponding maintenance log 16 are accessed to determine one or more maintenance tasks (for example corresponding to maintenance task types or ID codes) which are correlated with that comparable sensor log 53 (step S205). A maintenance task may be correlated with a comparable sensor log 53 if the corresponding maintenance task object 55 is within an interval following the time corresponding to the comparable sensor log 53.

For example, the maintenance task determining module 210 may control the fault maintenance correlation module 211 to access the maintenance logs corresponding to each comparable sensor log 53 and retrieve the maintenance objects 55 corresponding to times within an interval following that comparable sensor log 53. The interval may be predetermined or the interval may be specified by a user via the user interface 204.

Alternatively, the fault maintenance correlation module 211 may retrieve the maintenance objects 55 which correspond to times after the comparable sensor log and before the next sensor log 53 for the same machine 15 which is not one of the comparable sensor logs 53. In other words, the fault maintenance correlation module 211 may retrieve the maintenance objects 55 recorded between the occurrence of a similar prior anomaly and a time when the prior anomaly was rectified. The maintenance object 55 immediately preceding the rectification of the anomaly is a correlated maintenance object 55. A maintenance object 55 may include several maintenance tasks (for example having different maintenance task ID codes), and the most recent maintenance task recorded in the correlated maintenance object 55 is a correlated maintenance task. A further condition may be applied to determine a correlated maintenance task, namely, that the anomaly does not recur within an interval following the effective maintenance object 55, for example, no recurrence within 15 days.

The maintenance task determining module 210 may determine statistics for the correlated maintenance tasks. For example, the maintenance task determining module 210 may determine a percentage of comparable sensor logs 53 for which each possible maintenance task was carried out. The maintenance task determining module 210 may also determine the identity and number of spare parts and/or consumables which were used in connection with each correlated maintenance task.

The maintenance task determining module 210 selects a priority maintenance task from amongst the correlated maintenance tasks (step S206).

For example, the maintenance task determining module 210 may select the priority maintenance task as the maintenance task which is correlated to the most closely matched comparable sensor log 53, as determined by the ranking previously determined by the comparison and ranking module 209. Alternatively, the maintenance task determining module 210 may select the priority maintenance task based on the statistics for the correlated maintenance tasks. For example, the maintenance task determining module 210 may select the priority maintenance task to be the correlated maintenance task which was carried out for the largest percentage of comparable sensor logs 53.

The maintenance task determining module 210 outputs the priority maintenance task (step S207). For example, the maintenance task determining module 210 may output the priority maintenance task to the robotic maintenance system 202, which carries out the selected priority maintenance task. Optionally, the maintenance task determining module 210 also outputs a listing of the spare parts and/or consumables associated with the selected priority maintenance task.

Alternatively, the maintenance task determining module 210 may output the priority maintenance task to the report generation module 203, which prepares and outputs a physical report or work order to direct an engineer or mechanic to perform the priority maintenance task. Optionally, the maintenance task determining module 210 also outputs a listing of the spare parts and/or consumables associated with the selected priority maintenance task. Optionally, the report generation module 203 may access a manufacturer manual, extract a description of the selected priority maintenance task, and append the description to the physical report or work order.

In some examples, the maintenance task determining module 210 may output the priority maintenance task to the user interface 204. The maintenance task determining module 210 may output further information to the user interface 204 such as, for example, the ranking of comparable sensor logs 53, a list of the correlated maintenance tasks (for example a listing of the corresponding maintenance task types/ID codes), statistics for the correlated maintenance tasks and so forth. Optionally, the maintenance task determining module 210 also outputs a listing of the spare parts and/or consumables associated with the selected priority maintenance task. Optionally, the user interface may access a manufacturer manual, extract a description of the selected priority maintenance task, and display the description.

In some examples, the user interface 204 may be used to review and/or modify the selection of the priority maintenance task. Once a user is satisfied with the selection of the priority maintenance task, they may provide a command via the user interface 204 for the robotic maintenance system 202 to carry out the priority maintenance task and/or a command for the report generation module 203 to prepare and output a physical report or work order.

Figure 15:
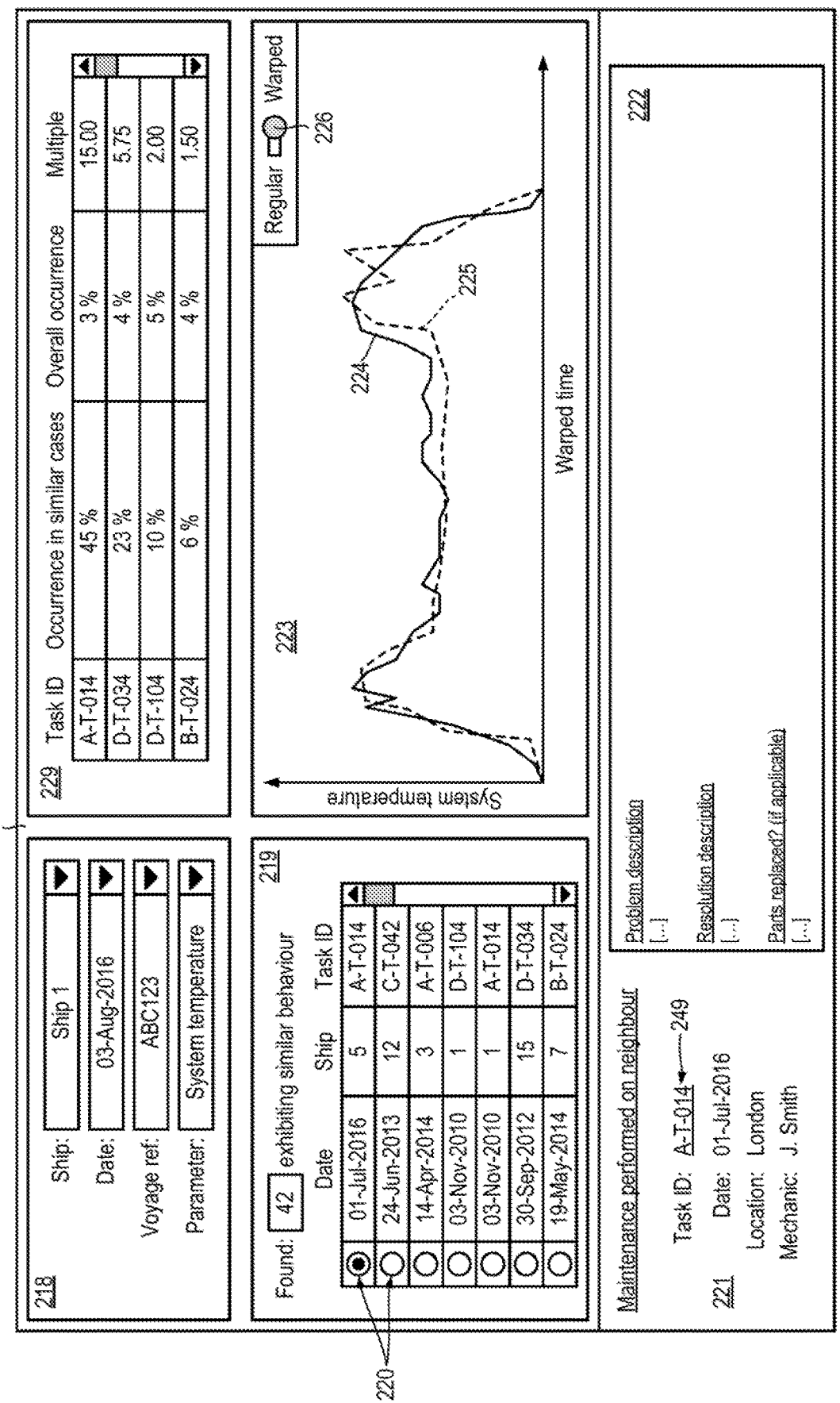
FIGS. 15 and 16 show a graphical user interface according to embodiments of this specification, the graphical user interface for selecting a maintenance task to resolve an anomaly of a machine.

Referring also to FIG. 15, a user interface 204 in the form of an anomaly analysis graphical user interface (GUI) 217 is shown.

The anomaly analysis GUI 217 is for use with machines 15 in the form of ships 15a. The method of determining a maintenance task to rectify an anomaly may make use of the anomaly analysis GUI 217. The anomaly analysis GUI 217 includes an anomaly information pane 218 for receiving information identifying an anomaly. The anomaly information pane 218 includes controls for providing user inputs identifying a ship 15a, a date, a voyage reference number to allow differentiation between different voyages on the same date, and a parameter of interest, i.e. a sensor 19, or sensor group 20 which is, or which is suspected to be, measuring anomalous parameter values. Information entered by a user via the anomaly analysis GUI 217 allows a target sensor log 212 stored in the database 7 to be identified.

The anomaly analysis GUI 217 includes a comparable anomalies pane 219. The comparable anomalies pane 219 lists the information corresponding to the comparable sensor logs 53 in a table. The comparable sensor logs 53 may have been determined by the comparison and ranking module 209 according to the method of determining a maintenance task to rectify an anomaly (see step 204). The table includes columns providing details of the date, the particular ship 15a and a maintenance task ID code (i.e. a maintenance task type) corresponding to each comparable sensor log 53.

The comparable anomalies pane 219 also includes controls 220 for selecting a comparable sensor log 53. In other words, the controls 220 allow a user to select data corresponding to a prior anomaly. The controls 220 are in the form of a radio button corresponding to each row of the table. The radio button corresponding to the most closely matched comparable sensor log 53 is pre-selected, but the user may change the selection using the anomaly analysis GUI 217. Alternative controls 220 may be provided. For example, the row of the table corresponding to the most closely matched comparable sensor log 53 may be pre-highlighted. A user may click on a different row to select a different comparable sensor log 53. The newly selected row of the table may be highlighted to provide visual feedback of the selection.

The anomaly analysis GUI 217 includes a maintenance task information pane 221 which provides further details of a maintenance task corresponding to the comparable sensor log 53 which is currently selected using the controls 220 of the comparable anomalies pane 219. For example, this could be the pre-selected closest match or a subsequent user selection made using the controls 220. The maintenance task information pane 221 includes further details of a maintenance task (corresponding to a maintenance task type/ID code) performed in relation to the selected comparable sensor log 53. The maintenance task information pane 221 includes a location at which the maintenance task was carried out and the name or other identifying information of an engineer or mechanic responsible for carrying out the maintenance task. The maintenance task information pane 221 also includes a log excerpt pane 222 which presents free-text notes made by the engineer or mechanic responsible for carrying out the maintenance task. The maintenance task ID is a hyperlink 249, so that when the user selects the maintenance task ID, a portion of a manufacturer maintenance manual corresponding to the maintenance task is displayed to the user, for example, in a new window or within the log excerpt pane 222.

The anomaly analysis GUI 217 includes a data visualisation pane 223 which displays a graph comparing a warped parameter profile 224 corresponding to the target sensor log 212 and a warped parameter profile 225 corresponding to the comparable sensor log 53 currently selected using the controls 220 of the comparable anomalies pane 219.

Figure 16:
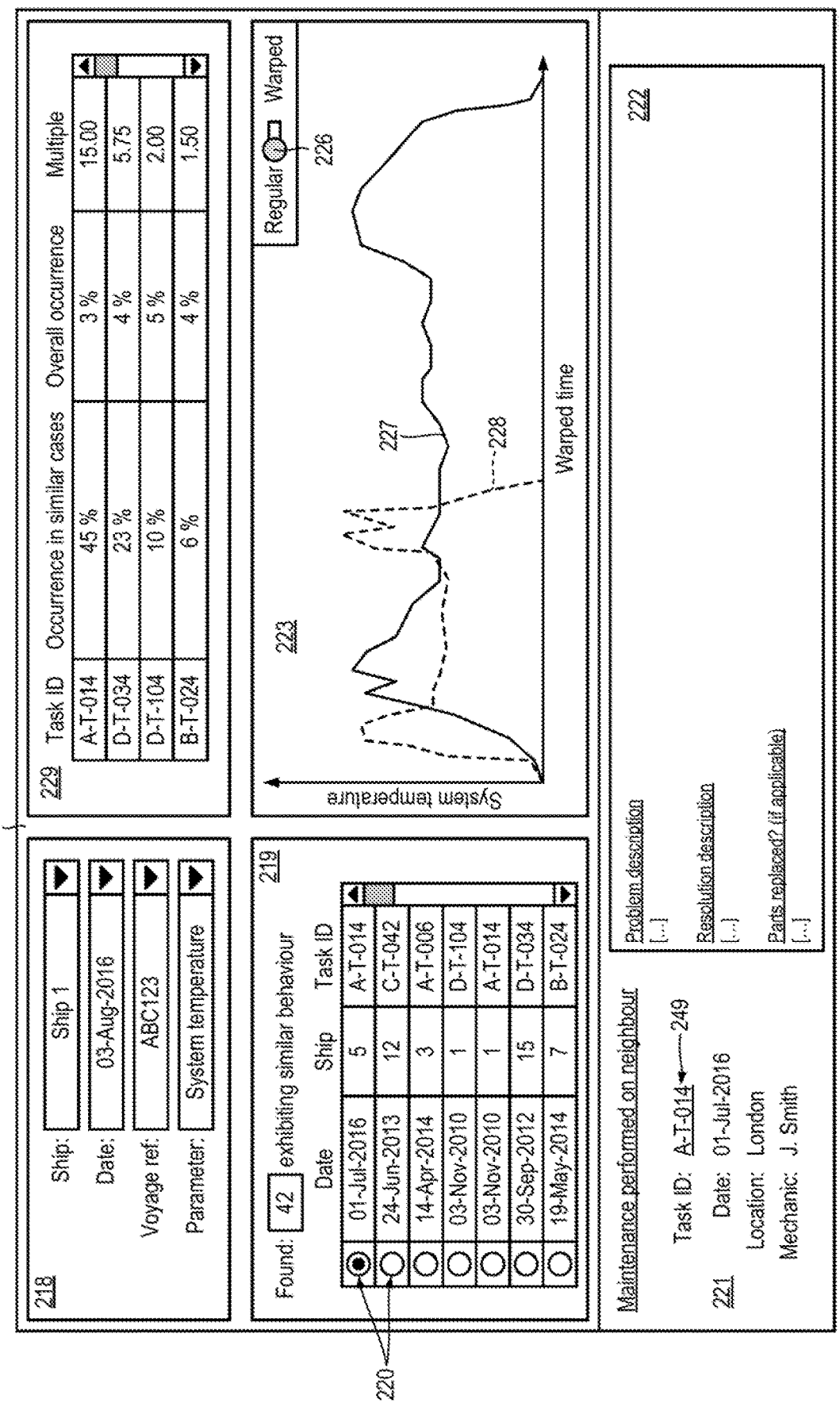

Referring also to FIG. 16, the data visualisation pane 223 also includes controls 226 for switching the graph the display an original parameter profile 227 corresponding to the target sensor log 212 and an original parameter profile 228 corresponding to the comparable sensor log 53 which is currently selected using the controls 220 of the comparable anomalies pane 219.

The anomaly analysis GUI 217 includes a maintenance task statistics pane 229. The maintenance task statistics pane 229 includes a table providing statistics for each correlated maintenance task, for example, as determined by the maintenance task determining module 210 and fault maintenance correlation module 211. The table includes a row corresponding to each correlated maintenance task and columns detailing a maintenance task ID code (i.e. the maintenance task type); the percentage occurrence of the comparable logs 53 which are correlated to a maintenance task object 55 including the same maintenance task ID code (i.e. maintenance task type); an overall percentage occurrence of any sensor logs 53 in the database 7 which are correlated to a maintenance task object 55 including the same maintenance task ID code (i.e. maintenance task type), and a multiple relating the percentage occurrences of the comparable logs and the sensor logs overall. The table is ordered from the highest to the lowest multiple. A maintenance task having a high multiple can be a good choice for the priority maintenance task. The table may optionally include a column including the actual number of comparable logs. This information may be useful, since a maintenance task performed in 100% of a single previous occurrence may be less convincing than a maintenance task performed in 70% of fifty previous occurrences. The table may optionally include a column providing details of the number and type of spare parts and/or consumables associated with each correlated maintenance task.

In some examples, a user may select a priority maintenance task from the table in the maintenance task statistics pane 229 and cause a command to be transmitted to the robotic maintenance system 202 to carry out the selected priority maintenance task. In other examples, a user may select a priority maintenance task from the table in the maintenance task statistics pane 229 and cause a command to be transmitted to the report generation module 203 to prepare and output a physical report or work order.

Although the method has been explained with reference to machines 15 in the form of ships 15a, it shall be appreciated that the method of rectifying an anomaly and the exemplary GUI 219 may also be applied to machines 15 in the form of construction machines 15b, or indeed any other machines 15 incorporating sensors 19.

Method of Rectifying a Fault

Figure 17:
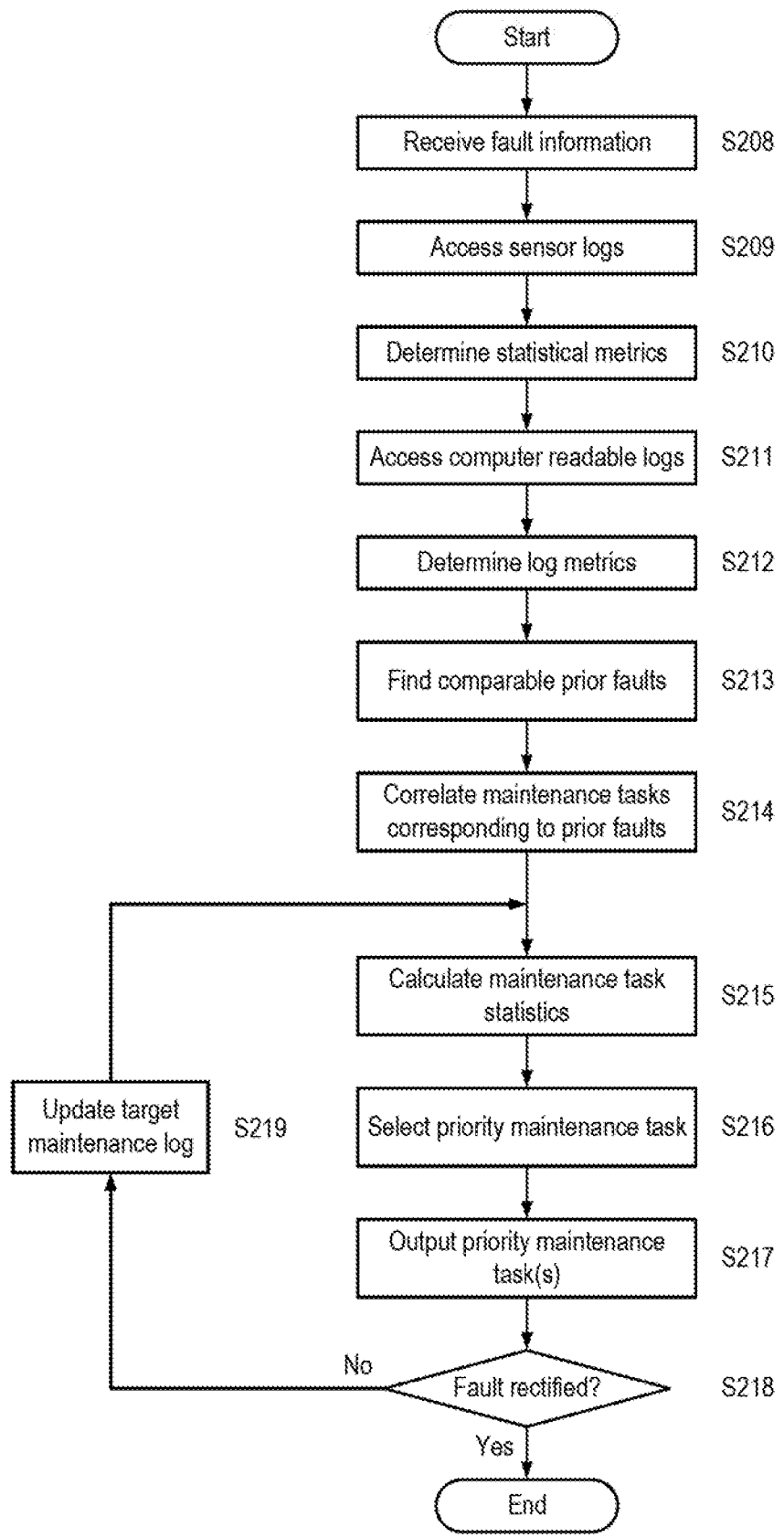
FIG. 17 is a process flow diagram of a method according to embodiments of this specification, the method for determining a maintenance task to resolve a fault of a machine.

Referring also to FIG. 17, a method of determining a maintenance task to rectify a fault in a machine 15 is explained.

A fault may be detected by one or more sub-system 18 and reported by a message 54 object including a message ID code corresponding to the type of fault, for example the message look-up table may map a message ID code to a specific fault ID code.

When a machine 15 has developed a fault, it may be difficult to determine and rectify the root cause. One or more maintenance tasks may be carried out which fail to rectify the fault, resulting in wasted time and other resources such as consumables and/or spare parts. By identifying prior faults having the same fault type and which occurred in similar circumstances, and correlating information about how faults with the same fault type were previously rectified, the method of determining a maintenance task to rectify a fault can help to improve the efficiency of rectifying faults of a machine 15. This can allow ineffective maintenance tasks to be avoided and effective maintenance tasks to be carried out sooner.

Fault information identifying a machine 15 and one or more operations of that machine 15 is received (step S208). An operation may correspond to a journey or working day of a ship 15 a or a construction machine 15b.

For example, fault information may be a target sensor log 212, a target fault log 213, a target maintenance log 214 and a target message log 21 received via the communication interface 205. Alternatively, information identifying an anomaly may be information identifying a target sensor log 212, a target fault log 213, a target maintenance log 214 and a target message log 21 which are already stored in the database 7. Fault information may be received via the user interface 204.

Sensor logs 53 and/or warped sensor logs 216 stored in the database 7 are accessed (step S209). If the fault information did not include a target sensor log 212 received via the communication interface 205, the target sensor log 212 is also accessed. The accessed sensor logs 53 are limited to sensor logs 53 which correspond to a fault log 17 which includes a fault object 56 within an interval following the sensor log 53. The interval may be pre-determined or user determinable. The accessed sensor logs 53 are limited to sensor logs 53 which correspond to the same fault type as the target fault object 56 of the target fault log 213. Alternatively, the accessed sensor logs 53 may be limited to sensor logs 53 which correspond to a fault type which is associated with the same sub-system 18 as the target fault object 56 of the target fault log 213.

The target sensor log 212 and sensor logs 53, and/or warped sensor logs 216 are compared to determine statistical metrics (step S210).

For example, the statistical metric determining module 206 receives the target sensor log 212, accesses sensor logs 53 stored in the database 7 and processes the target sensor log 212 and sensor logs 53 to determine statistical metrics. Referring again to FIG. 5, the statistical metric determining module 205 determines the mean, standard deviation minimum and/or maximum of a difference between a first parameter curve corresponding to the target sensor log 212 and a second parameter curve corresponding to another sensor log 53. The first parameter curve and second parameter curve may be quantitatively ranked in terms of similarity using the output of a hidden Markov model. The sensor logs 53 may correspond to other machines 15 and also to previous operations of the machine 15 corresponding to the target sensor log 212. The statistical metric determining module 205 determines statistical metrics by comparing the target sensor log 212 against all the other sensor logs 53 in the database. The statistical metrics determined in this way may be used to identify which of the sensor logs 53 most closely match the target sensor log 212 corresponding to the anomalous behaviour.

The statistical metric determining module 206 may also determine statistical metrics based on warped sensor logs 216. For example, referring again to FIGS. 7 to 10, the sensor log warping module 208 may receive the target sensor log 212, retrieve the sensor logs 53 and generate warped sensor logs 216 (for example warped curves 56) as described hereinbefore with reference to FIGS. 7 to 10. The sensor log warping module 208 may warp each sensor log 53 with reference to the target sensor log 212. The statistical metric determining module 206 may determine statistical metrics based on the warped target sensor log and the warped sensor logs 216 in the same way as for the target sensor log 212 and sensor logs 53.

The warped sensor logs 216 may be determined in advance and stored separately in the database 7. If the database 7 stores warped sensor logs 216 corresponding to each sensor log 53 warped to a single, common time-frame, then the sensor log warping module 208 may warp the target sensor log 212 to generate a warped target sensor log spanning the same common time-frame. Previously stored warped sensor logs 216 may be retrieved and processed by the statistical metric determining module 206 in the same way as sensor logs 53.

Additionally or alternatively, the statistical metric determining module 206 may determine the mean, standard deviation, minimum or maximum of a difference between a parameter curve corresponding to the target sensor log 212 or another sensor log 53 (for example parameter curve 59) and an average parameter curve (for example average parameter curve 60) determined by aggregating a large number of sensor logs 53 across a number of different machines 15 and/or operations of the machines. The difference between a parameter curve corresponding to the target sensor log 212 or another sensor log 53 (for example parameter curve 59) and an average parameter curve (for example average parameter curve 60) may be quantified based on a hidden Markov model. The average parameter curves may be determined in advance and stored separately in the database 7. Alternatively, the average parameter curve may be determined based on a number of sensor logs 53, then immediately used to determine statistical metrics for the target sensor log 212 and the sensor logs 53. Average warped curves may similarly be determined in advance and stored separately in the database 7 before retrieval by the statistical metric determining module 206. Alternatively, a number of warped sensor logs 216 may be determined by the sensor log warping module 208 and received directly by the statistical metric determining module 206 in order to determine an average warped curve. Statistical metrics may be determined using average warped parameter curves in the same way as for average parameter curves.

Maintenance logs 16, fault logs 17 and message logs 21 stored in the database 7 are accessed (step S211). If the fault information identified but did not include a target fault log 213, target maintenance log 214 and a target message log 215 received via the communication interface 205, then the target fault log 213, target maintenance log 214 and/or target message log 215 are accessed from the database 7. The accessed computer readable logs 16, 17, 21 are limited to those which correspond to a fault log 17 which includes a fault object 56 which has the same fault type as the target fault object 56 of the target fault log 213. Alternatively, the accessed computer readable logs 16, 17, 21 may be limited to those which correspond to a fault type which is associated with the same sub-system 18 as the target fault object 56 of the target fault log 213.

The target computer readable logs 213, 214, 215 and computer readable logs 16, 17, 21 are compared to determine log metrics (step S212).

For example, the log metric determining module 207 may receive target computer readable logs 213, 214, 215, access the computer readable logs 16, 17, 21 and determine log metrics based on the maintenance logs 16, 214, fault logs 17, 213 and optionally message logs 21, 215. Where the target computer readable logs 213, 214, 215 and/or computer readable logs 16, 17, 21 include free-text information, the log metric determining module 207 may perform keyword searching to establish frequencies of occurrence of particular words or phrases during one or more time intervals. The log metric determining module 207 may include a database including synonyms for keywords and/or common misspellings. Frequencies of occurrence of particular words or phrases (or synonyms thereof) in the computer readable logs 16, 17, 21 213, 214, 215 during one of more time intervals may be used as log metrics. The log metric determining module 207 may employ natural language processing to determine patterns in free-text information. Additionally or alternatively, message objects 54, maintenance task objects 55 and fault objects 56 may include respective ID codes (corresponding to message types, maintenance task types and fault types), and frequencies of occurrence of the ID codes during one of more time intervals may be used as log metrics.

One or more prior fault objects 56 which are comparable to a target fault object 56 recorded in the target fault log 213 are determined based on a combination of the statistical metrics and the log metrics (step S213).

For example, the comparison and ranking module 209 may receive the statistical metrics and log metrics and determine a ranking of prior fault objects 56 stored in fault logs 17, based on how closely each matches the target fault object 56 of the target fault log 213. This may include prior fault objects 56 from the target fault log 213 as well as other fault logs 17, since prior faults of the machine 15 which is currently experiencing a fault (corresponding to the target fault) need not be excluded from the analysis.

A ranking metric may be used. For example, a ranking metric may be calculated by combining multiple statistical metrics and log metrics into a single value using a function which takes the statistical metrics and log metrics as inputs and provides a single output value. One example of a ranking metric may be obtained by summing the individual statistical metrics with or without weightings. An alternative ranking metric may be determined by assigning a rank based on each individual statistical metric and each individual log metric, where a rank of one is always given to the closest match. The ranks for each individual statistical metric and each individual log metric corresponding to a particular prior fault object 56 may be summed to provide a rank metric which will be a minimum for the closest match (according to this metric). In yet another example, the previous fault objects 56 may be ranked according to the statistical metrics derived from corresponding sensor logs 53, with rank conflicts resolved using the log metrics until each previous fault object 56 has a unique rank.

The comparable prior fault objects 56 may be determined as those prior fault objects 56 which are ranked as closest to the target fault object 56. For example, the comparable prior fault objects 56 may include the ten fault objects 56 ranked as the closest to the target fault object 56. Alternatively, the comparable prior fault objects 56 may include the twenty closest, the fifty closest and so forth. In other examples, the comparable prior fault objects 56 may include all the relevant fault objects 56 having statistical metrics and/or ranking metrics which exceed a predefined threshold or a user selectable threshold. Alternatively, the comparable prior fault objects 56 may include all the relevant fault objects 56 having statistical metrics and/or ranking metrics which are less than a predefined threshold or a user selectable threshold.

For each machine 15 corresponding to a comparable prior fault object 56, the corresponding maintenance log 16 is accessed to determine one or more maintenance tasks which are correlated with that comparable prior fault object 56 (step S214). A maintenance task is correlated with a comparable prior fault object 56 if it corresponds to a maintenance task object 55 which lies within an interval between the fault start time recorded in the fault data 57 and the end time recorded by the fault resolution data 58. The maintenance object 55 immediately preceding the rectification of the prior fault is a correlated maintenance object 55. A maintenance object 55 may include several maintenance tasks (for example having different maintenance task ID codes), and the most recent maintenance task recorded in the correlated maintenance object 55 is a correlated maintenance task. A further condition may be applied to determine a correlated maintenance task, namely, that the fault does not recur within an interval following the effective maintenance object 55, for example, no recurrence within 15 days.

A maintenance task is also correlated with a fault object 56 if the corresponding fault resolution data 58 specifies that the maintenance task (corresponding to a maintenance task type/ID code) rectified the fault. For example, the maintenance task determining module 210 may control the fault maintenance correlation module 211 to access the maintenance logs corresponding to each comparable prior fault object 56 and retrieve the maintenance objects 55 corresponding to times between the fault start time recorded in the fault entry 57 and the end time recorded by the fault resolution entry 58. Alternatively, the maintenance task determining module 210 may control the fault maintenance correlation module 211 to access the maintenance logs corresponding to each comparable prior fault object 56 and retrieve the maintenance objects 55 corresponding to times within an interval following that prior fault object 56. The interval may be predetermined or the interval may be specified by a user via the user interface 204.

Maintenance task statistics are calculated for the correlated maintenance tasks (step S215). For example, the maintenance task determining module 210 may determine statistics for the correlated maintenance tasks. The maintenance task determining module 210 may determine a percentage of comparable prior fault objects 56 for which each possible maintenance task was carried out. The maintenance task determining module 210 may also determine the identity and number of spare parts and/or consumables which were used in connection with each correlated maintenance task.

A priority maintenance task is selected from amongst the correlated maintenance tasks (step S216).

The maintenance task determining module 210 may select the priority maintenance task as the maintenance task which is correlated to the most closely matched comparable prior fault object 56, for example, as determined by the ranking performed by the comparison and ranking module 209. Alternatively, the maintenance task determining module 210 may select the priority maintenance task based on the statistics for the correlated maintenance tasks. For example, the maintenance task determining module 210 may select the priority maintenance task to be the correlated maintenance task which was carried out for the largest percentage of comparable prior fault objects 56.

The maintenance task determining module 210 outputs the priority maintenance task (step S217). For example, the maintenance task determining module 210 may output the priority maintenance task to the robotic maintenance system 202, which carries out the selected priority maintenance task. Optionally, the maintenance task determining module 210 also outputs a listing of the spare parts and/or consumables associated with the selected priority maintenance task.

Alternatively, the maintenance task determining module 210 may output the priority maintenance task to the report generation module 203, which prepares and outputs a physical report or work order to direct an engineer or mechanic to perform the priority maintenance task. Optionally, the maintenance task determining module 210 also outputs a listing of the spare parts and/or consumables associated with the selected priority maintenance task. Optionally, the report generation module 203 may access a manufacturer manual, extract a description of the selected priority maintenance task, and append the description to the physical report or work order.

In some examples, the maintenance task determining module 210 may output the priority maintenance task to the user interface 204. The maintenance task determining module 210 may output further information to the user interface 204 such as, for example, the ranking of comparable prior fault objects 56, a list of the correlated maintenance tasks (i.e. listing the corresponding maintenance task types/ID codes), statistics for the correlated maintenance tasks and so forth. Optionally, the maintenance task determining module 210 also outputs a listing of the spare parts and/or consumables associated with the selected priority maintenance task. Optionally, the user interface may access a manufacturer manual, extract a description of the selected priority maintenance task, and display the description.

In some examples, the user interface 204 may be used to review and/or modify the selection of the priority maintenance task. Once a user is satisfied with the selection of the priority maintenance task, they may provide a command via the user interface 204 for the robotic maintenance system 202 to carry out the priority maintenance task and/or a command for the report generation module 203 to prepare and output a physical report or work order.

After the priority maintenance task has been carried out, the machine 15 is checked to determine whether the present fault has been rectified (step S18). The fault status may be checked automatically or manually. If the fault has been rectified (step S18; Yes), the machine 15 may be brought back into service.

However, if the fault has not been rectified (step S218; No), then the target maintenance log 214 is updated to include a new maintenance task object 55 corresponding to the priority maintenance task carried out (step S219). The maintenance task statistics are updated to account for the maintenance task already carried out (step S215), and a new priority maintenance task is selected (S216) and output (step S17).

For example, an initial ranking may have included first, second and third maintenance tasks, ranked in that order. However, it could be the case that on prior occasions where the first maintenance task does not rectify the fault, the conditional probability of the third maintenance task rectifying the fault is larger than the conditional probability of the second maintenance task rectifying the fault. In this way, updating the target maintenance log 214 and re-analysing the maintenance task statistics may improve efficiency as compared to simply working down the initial ranked list of maintenance tasks.

Figure 18:
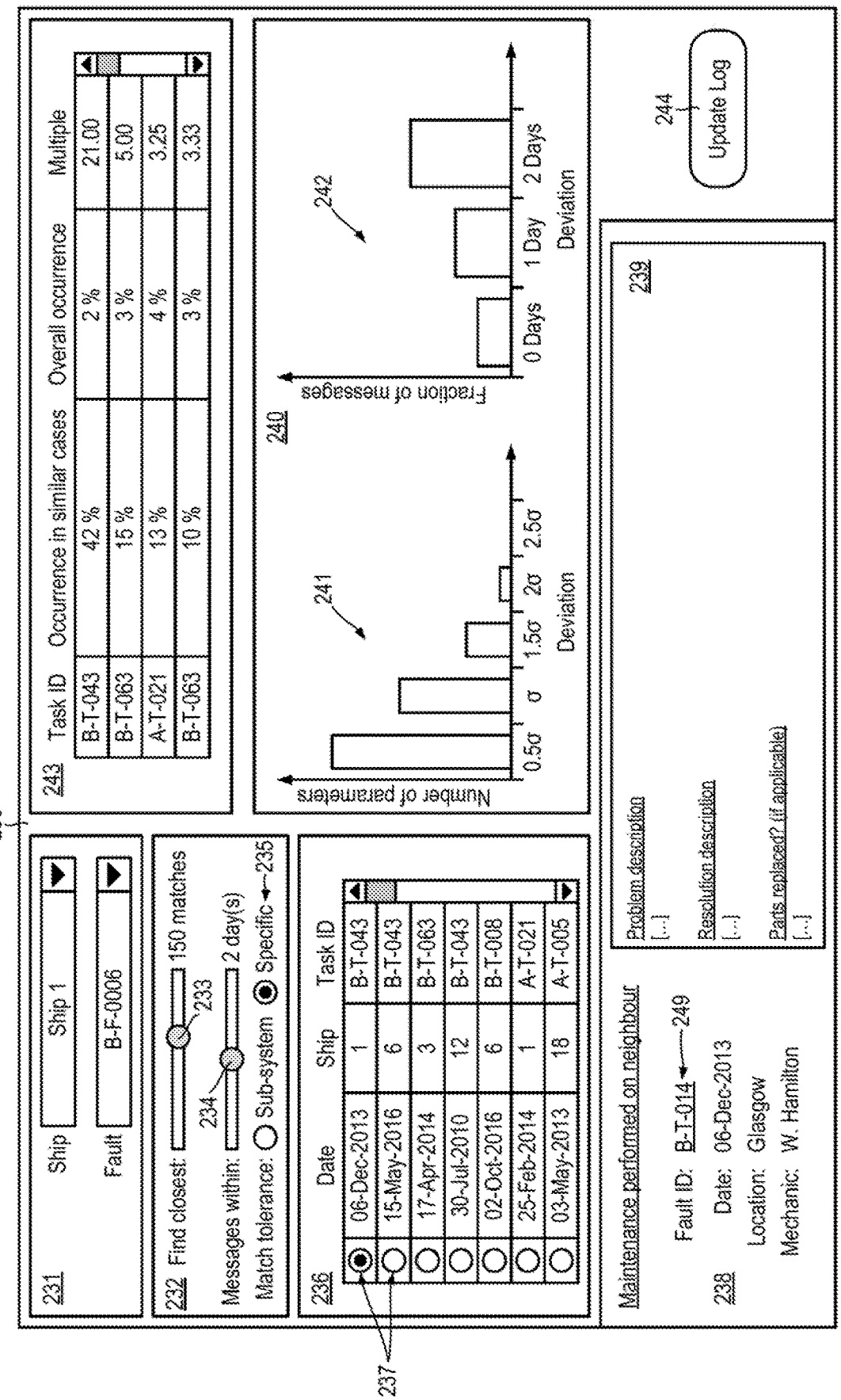
FIG. 18 shows a graphical user interface according to embodiments of this specification, the graphical user interface for selecting a maintenance task to resolve a fault of a machine.

Referring also to FIG. 18, a user interface 204 in the form of a fault analysis graphical user interface (GUI) 230 is shown.

The fault analysis GUI 230 is for use with machines 15 in the form of ships 15a. The method of determining a maintenance task to rectify a fault may make use of the fault analysis GUI 230. The fault analysis GUI 230 includes a fault information pane 231 for receiving information identifying fault. The fault information pane 231 includes controls for providing user inputs identifying a ship 15a and a fault type in the form of a fault ID code. Information entered by a user via the fault analysis GUI 230 allows a target sensor log 212, target fault log 213, target maintenance log 214 and target message log 215 stored in the database 7 to be identified.

The fault analysis GUI 230 includes a search parameter pane 232. The search parameter pane 232 includes a first control 233, in the form of a slider, for receiving a user input of the number of comparable prior fault objects 56 to find, for example the one hundred and fifty closest matches. The comparable prior fault objects 56 will be used by the maintenance task determining module 210 and fault maintenance correlation module 211 to identify and analyse correlated maintenance tasks. The search parameter pane 232 includes a second control 234, in the form of a slider, for receiving a user input of a time interval before a prior fault object 56 for which message objects 54 should be included in the determination of log metrics, for example, message objects 54 generated within a period of two days leading up to a prior fault object 56 may be included in the determination of log metrics. The search parameter pane 232 includes third controls 235, in the form of radio buttons, to receive a user selection of a matching tolerance for message objects 54 to be considered as matching. For example, two message objects 54 may be considered to match only when they have identical message ID codes, i.e. B-M-002 matches B-M-002 but B-M-002 does not match B-M-003. Alternatively, two message objects 54 may be considered to match provided that both have message ID codes which are associated with the same sub-system, i.e. B-M-002 matches B-M-002 or B-M-037, but B-M-002 does not match C-M-021.

The fault analysis GUI 230 includes a comparable faults pane 236. The comparable faults pane 236 lists the information corresponding to the comparable prior fault objects 56 in a table, for example, the comparable prior fault objects 56 as determined by the comparison and ranking module 209 according to the method of determining a maintenance task to rectify a fault (step 213). The table includes columns providing details of the date, the particular ship 15*a* and a maintenance task ID code (i.e. maintenance task type) corresponding to each comparable prior fault object 56, for example the maintenance task ID code (i.e. maintenance task type) may correspond to the maintenance task recorded as rectifying the fault in the fault resolution entry 58 of the prior fault object 56.

The comparable faults pane 236 also includes controls 237 for selecting a comparable prior fault object 56. The controls 237 are in the form of a radio button corresponding to each row of the table. The radio button corresponding to the most closely matched comparable prior fault object is pre-selected, but a user may change the selection using the fault analysis GUI 230. Alternative controls may be provided such as, for example, the row of the table corresponding to the most closely matched comparable prior fault object 56 may be pre-highlighted. A user may click on a different row to select a different prior fault object 56, and the corresponding row of the table will be highlighted.

The fault analysis GUI 230 includes a maintenance task information pane 238 which provides further details of a maintenance task corresponding to the comparable prior fault object 56 which is currently selected using the controls 237 of the comparable faults pane 236. For example, this could be the pre-selected closest match or a subsequent user selection using the controls 237. The maintenance task information pane 238 includes further details of a maintenance task performed in relation the selected comparable prior fault object 56, such as a location at which the maintenance task was carried out and the name or other identifying information of an engineer or mechanic responsible for carrying out the maintenance task. The maintenance task information pane 238 also includes a log excerpt pane 239 which presents free-text notes made by the engineer or mechanic responsible for carrying out the maintenance task. The maintenance task ID is a hyperlink 249, so that when the user selects the maintenance task ID, a portion of a manufacturer maintenance manual corresponding to the maintenance task is displayed to the user, for example, in a new window or within the log excerpt pane 222.

The fault analysis GUI 230 includes a data visualisation pane 240. The data visualisation pane 240 includes a first histogram 241 which shows an overview of statistical metrics and a second histogram 242 which shows an overview of log metrics determined based on the target message logs 215 and message logs 21. The first and second histograms 241, 242 are based on data corresponding to the comparable prior fault objects 56 which is currently selected using the controls 237 of the comparable faults pane 236. The first histogram 241 displays frequencies for measured parameter values of the corresponding sensor log 53, binned according to a deviation of each measured parameter (i.e. each sensor 19) from the target sensor log 212. The bins are defined by reference to the standard error σ of deviations from the target sensor log 212. The second histogram 242 displays frequencies for the number of message objects 54 in the target message log 215 which are matched (to the tolerance entered using controls 235) to message objects 54 in the message log 21 corresponding to the currently selected fault object 56 and occurring within an interval (entered using controls 234) before the currently selected fault object 56. The first and second histograms 241, 242 provide an easily understood at-a-glance overview of the match between a currently selected fault object 56 and the target fault object. Essentially, a good match has first and second histograms 241, 242 which are skewed toward the respective origins, and a bad match has first and second histograms 241, 242 which are skewed away from the respective origins.

The fault analysis GUI 230 includes a maintenance task statistics pane 243. The maintenance task statistics pane 243 includes a table providing statistics for each correlated maintenance task, for example, as determined by the maintenance task determining module 210 and fault maintenance correlation module 211. The table includes a row corresponding to each correlated maintenance task and columns detailing a maintenance task ID code (i.e. maintenance task type); the percentage occurrence of the maintenance task amongst the comparable prior fault objects 56; an overall percentage occurrence of the maintenance task amongst all fault objects 56 in the database 7, and a multiple relating the percentage occurrences of the maintenance task in relation to the comparable fault objects 56 and the fault objects 56 overall. The table is ordered from the highest to the lowest multiple. A maintenance task having a high multiple can be a good choice for the priority maintenance task. The table may optionally include a column including the actual number of comparable prior fault objects 56. This information may be useful, since a maintenance task performed in 100% of a single previous occurrence may be less convincing than a maintenance task performed in 70% of fifty previous occurrences. The table may optionally include a column providing details of the number and type of spare parts and/or consumables associated with each correlated maintenance task.

The fault analysis GUI 230 includes a button 244 to update the target maintenance task log 214. When the button 244 is activated, a dialog interface 245 is opened to allow a user to input information about a newly carried out maintenance task (see also steps S218, S219, S15, S216 and S217 with reference to FIG. 17). The dialog interface 245 includes first and second maintenance task input panes 246, 247 to allow a user to enter information such as maintenance ID codes (i.e. the maintenance task type) and free text notes providing details of a maintenance task carried out. The dialog interface 245 includes a button 248 for adding third and subsequent maintenance task input panes. The dialog interface 245 includes a resolution outcome pane for the user to indicate whether or not the present fault has been rectified by the maintenance task(s) performed using radio buttons. The dialog interface 245 also includes a confirmation button 250 and a cancellation button 251.

In this way, the fault analysis GUI 230 may be used to provide feedback as to whether or not a priority maintenance task has been rectified (step S218). If the fault has not been rectified (step S218; No), the target maintenance log 214 is updated to include a new maintenance task object corresponding to the priority maintenance task carried out (step S219). The maintenance task statistics are updated to account for the maintenance task already carried out (step S215), and a new priority maintenance task is selected (S216) and output (step S17).

In some examples, a user may select a priority maintenance task from the table in the maintenance task statistics pane 243 and cause a command to be transmitted to the robotic maintenance system 202 to carry out the selected priority maintenance task. In other examples, a user may select a priority maintenance task from the table in the maintenance task statistics pane 243 and cause a command to be transmitted to the report generation module 203 to prepare and output a physical report or work order.

Although the method has been explained with reference to machines 15 in the form of ships 15*a*, it shall be appreciated that the method of rectifying a fault and the exemplary GUI 230 may also be applied to machines 15 in the form of construction machines 15*b*, or indeed any other machines 15 incorporating sensors 19.

MODIFICATIONS

It will be appreciated that many modifications may be made to the embodiments hereinbefore described. Such modifications may involve equivalent and other features which are already known in the design, manufacture and use of data processing and analysis systems and which may be used instead of or in addition to features already described herein. Features of one embodiment may be replaced or supplemented by features of another embodiment.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicant hereby gives notice that new claims may be formulated to such features and/or combinations of such features during the prosecution of the present application or of any further application derived therefrom.

The invention claimed is:

1. A computer-implemented method for determining a priority maintenance task to rectify an anomaly associated with a first machine, wherein the method is performed using one or more processors, the method comprising:

accessing a target sensor log corresponding to the first machine;

accessing a plurality of historical sensor logs, wherein at least one historical sensor log corresponds to a second machine of a same type as the first machine;

determining a set of statistical metrics based at least in part on a comparison of the target sensor log to the plurality of historical sensor logs;

ranking the plurality of historical sensor logs based at least in part on the set of statistical metrics;

selecting a subset of historical sensor logs comparable to the target sensor log from the plurality of historical sensor logs based at least in part on the ranking;

accessing a set of maintenance logs, wherein each maintenance log corresponds to a respective historical sensor log in the subset of comparable historical sensor logs and comprises a respective one or more maintenance task objects, each maintenance task object comprising a respective one or more maintenance tasks;

identifying, based at least in part on the set of maintenance logs, a set of maintenance task objects, each of which is associated with a respective time interval after a respective corresponding historical sensor log;

identifying one or more correlated maintenance task objects from the set of maintenance task objects, wherein identifying the one or more correlated maintenance task objects comprises identifying each maintenance task object in the set of maintenance task objects that rectified a respective prior machine anomaly; and selecting a particular maintenance task from one of the one or more correlated maintenance task objects as the priority maintenance task.

2. The computer-implemented method of claim 1, wherein the anomaly associated with the first machine comprises a value of a sensed parameter differing from an average value of the sensed parameter by more than a threshold amount.

3. The computer-implemented method of claim 1, wherein determining each maintenance task object in the set of maintenance task objects that rectified a respective prior machine anomaly comprises determining each maintenance task object in the set of maintenance task objects that was last to be recorded prior to occurrence of a sensor log that is associated with a same machine as the respective historical sensor log to which the maintenance task object corresponds and that is not comparable to the target sensor log.

4. The computer-implemented method of claim 1, wherein selecting the subset of historical sensor logs from the plurality of historical sensor logs based at least in part on the ranking comprises selecting a predetermined number of the plurality of historical sensor logs that are ranked closest to the target sensor log as the subset of historical sensor logs.

5. The computer-implemented method of claim 1, wherein determining the set of statistical metrics comprises:

determining, from the target sensor log, a first set of sensor measurements corresponding to a sensed parameter;

determining, from historical sensor measurements contained in the plurality of historical sensor logs, a historical value of the sensed parameter; and comparing the first set of sensor measurements corresponding to the sensed parameter to the historical value of the sensed parameter to determine a particular statistical metric of the set of statistical metrics.

6. The computer-implemented method of claim 5, wherein comparing the first set of sensor measurements corresponding to the sensed parameter to the historical value of the sensed parameter to determine the particular statistical metric comprises:
   calculating a first parameter curve representing a plot of the first set of sensor measurements over time;
   calculating a second parameter curve representing a plot of the historical value of the sensed parameter over time; and
   calculating the particular statistical metric based at least in part on a deviation between the first parameter curve and the second parameter curve.

7. The computer-implemented method of claim 6, further comprising:
   re-determining the historical value of the sensed parameter based at least in part on new sensor logs that include additional sensor measurements of the sensed parameter; and
   re-calculating the second parameter curve based at least in part on the re-determined historical value.

8. The computer-implemented method of claim 1, further comprising:
   accessing a target maintenance log corresponding to the first machine;
   accessing a target fault log comprising a target fault object corresponding to the first machine, the target fault object comprising a time, a duration, and a fault type;
   accessing a target message log corresponding to the first machine and comprising a plurality of message objects, each message object comprising a respective time and a respective message type; and
   determining a set of log metrics based at least in part on the target maintenance log, the target fault log, and the target message log,
   wherein ranking the plurality of historical sensor logs further comprises ranking the plurality of historical sensor logs further based at least in part on the log metrics.

9. The computer-implemented method of claim 1, wherein ranking the plurality of historical sensor logs based at least in part on the set of statistical metrics comprises:
   assigning a respective sub-ranking to each historical sensor log with respect to each statistical metric; and
   aggregating each respective sub-ranking for each historical sensor log to obtain a respective rank metric for each historical sensor log.

10. The computer-implemented method of claim 1, wherein selecting the particular maintenance task from one of the one or more correlated maintenance task objects as the priority maintenance task comprises selecting the particular maintenance task from the correlated maintenance task object that corresponds to a historical sensor log ranked closest to the target sensor log.

11. A system for determining a priority maintenance task to rectify an anomaly associated with a first machine, the system comprising:
   at least one processor; and
   at least one memory storing instructions that, when executed by the at least one processor, cause the system to perform:
      accessing a target sensor log corresponding to the first machine;
      accessing a plurality of historical sensor logs, wherein at least one historical sensor log corresponds to a second machine of a same type as the first machine;
      determining a set of statistical metrics based at least in part on a comparison of the target sensor log to the plurality of historical sensor logs;
      ranking the plurality of historical sensor logs based at least in part on the set of statistical metrics;
      selecting a subset of historical sensor logs comparable to the target sensor log from the plurality of historical sensor logs based at least in part on the ranking;
      accessing a set of maintenance logs, wherein each maintenance log corresponds to a respective historical sensor log in the subset of comparable historical sensor logs and comprises a respective one or more maintenance task objects, each maintenance task object comprising a respective one or more maintenance tasks;
      identifying, based at least in part on the set of maintenance logs, a set of maintenance task objects, each of which is associated with a respective time interval after a respective corresponding historical sensor log;
      identifying one or more correlated maintenance task objects from the set of maintenance task objects, wherein identifying the one or more correlated maintenance task objects comprises identifying each maintenance task object in the set of maintenance task objects that rectified a respective prior machine anomaly; and
      selecting a particular maintenance task from one of the one or more correlated maintenance task objects as the priority maintenance task.

12. The system of claim 11, wherein the anomaly associated with the first machine comprises a value of a sensed parameter differing from an average value of the sensed parameter by more than a threshold amount.

13. The system of claim 11, wherein determining each maintenance task object in the set of maintenance task objects that rectified a respective prior machine anomaly comprises determining each maintenance task object in the set of maintenance task objects that was last to be recorded prior to occurrence of a sensor log that is associated with a same machine as the respective historical sensor log to which the maintenance task object corresponds and that is not comparable to the target sensor log.

14. The system of claim 11, wherein selecting the subset of historical sensor logs from the plurality of historical sensor logs based at least in part on the ranking comprises selecting a predetermined number of the plurality of historical sensor logs that are ranked closest to the target sensor log as the subset of historical sensor logs.

15. The system of claim 11, wherein determining the set of statistical metrics comprises:
   determining, from the target sensor log, a first set of sensor measurements corresponding to a sensed parameter;
   determining, from historical sensor measurements contained in the plurality of historical sensor logs, a historical value of the sensed parameter; and
   comparing the first set of sensor measurements corresponding to the sensed parameter to the historical value of the sensed parameter to determine a particular statistical metric of the set of statistical metrics.

16. The system of claim 15, wherein comparing the first set of sensor measurements corresponding to the sensed parameter to the historical value of the sensed parameter to determine the particular statistical metric comprises:
   calculating a first parameter curve representing a plot of the first set of sensor measurements over time;

calculating a second parameter curve representing a plot of the historical value of the sensed parameter over time; and calculating the particular statistical metric based at least in part on a deviation between the first parameter curve and the second parameter curve.

17. The system of claim 16, wherein execution of the stored instructions by the at least one processor further causes the system to perform:

re-determining the historical value of the sensed parameter based at least in part on new sensor logs that include additional sensor measurements of the sensed parameter; and re-calculating the second parameter curve based at least in part on the re-determined historical value.

18. The system of claim 11, wherein execution of the stored instructions by the at least one processor further causes the system to perform:

accessing a target maintenance log corresponding to the first machine;

accessing a target fault log comprising a target fault object corresponding to the first machine, the target fault object comprising a time, a duration, and a fault type;

accessing a target message log corresponding to the first machine and comprising a plurality of message objects, each message object comprising a respective time and a respective message type; and determining a set of log metrics based at least in part on the target maintenance log, the target fault log, and the target message log, wherein ranking the plurality of historical sensor logs further comprises ranking the plurality of historical sensor logs further based at least in part on the log metrics.

19. The system of claim 11, wherein ranking the plurality of historical sensor logs based at least in part on the set of statistical metrics comprises:

assigning a respective sub-ranking to each historical sensor log with respect to each statistical metric; and aggregating each respective sub-ranking for each historical sensor log to obtain a respective rank metric for each historical sensor log.

20. The system of claim 11, wherein selecting the particular maintenance task from one of the one or more correlated maintenance task objects as the priority maintenance task comprises selecting the particular maintenance task from the correlated maintenance task object that corresponds to a historical sensor log ranked closest to the target sensor log.

* * * * *